(12) United States Patent
Nimbalker et al.

(10) Patent No.: US 12,389,332 B2
(45) Date of Patent: Aug. 12, 2025

(54) WAKE-UP SIGNAL (WUS) CONTROLLED ACTIONS

(71) Applicant: Telefonaktiebolaget LM Ericsson (publ), Stockholm (SE)

(72) Inventors: Ajit Nimbalker, Fremont, CA (US); Ravikiran Nory, San Jose, CA (US); Sina Maleki, Malmö (SE); Pramod Jacob Mathecken, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 546 days.

(21) Appl. No.: 17/421,083

(22) PCT Filed: Jan. 8, 2020

(86) PCT No.: PCT/SE2020/050005
§ 371 (c)(1),
(2) Date: Jul. 7, 2021

(87) PCT Pub. No.: WO2020/145869
PCT Pub. Date: Jul. 16, 2020

(65) Prior Publication Data
US 2022/0116875 A1 Apr. 14, 2022

Related U.S. Application Data

(60) Provisional application No. 62/790,552, filed on Jan. 10, 2019.

(51) Int. Cl.
*H04W 52/02* (2009.01)
*H04L 5/00* (2006.01)

(52) U.S. Cl.
CPC ....... *H04W 52/0232* (2013.01); *H04L 5/0051* (2013.01); *H04L 5/0053* (2013.01); *H04W 52/0216* (2013.01)

(58) Field of Classification Search
CPC ....... H04W 72/23; H04W 4/80; H04W 4/029; H04W 84/12; H04W 4/02; H04W 24/08;
(Continued)

(56) References Cited

U.S. PATENT DOCUMENTS

2020/0094814 A1* 3/2020 Bowman .................. B60L 58/13

FOREIGN PATENT DOCUMENTS

WO   WO-2013099268 A1 *  7/2013 ........... H04L 5/0053
WO      2018231978 A1    12/2018
(Continued)

OTHER PUBLICATIONS

"3GPP TS 38.211 V15.3.0", 3rd Generation Partnership Project; Technical Specification Group Radio Access Network; NR; Physical channels and modulation (Release 15), Sep. 2018, pp. 1-96.
(Continued)

*Primary Examiner* — Khalid W Shaheed
(74) *Attorney, Agent, or Firm* — Sage Patent Group

(57) ABSTRACT

Embodiments include methods for a user equipment (UE) to perform different operations based on detection of wake-up signal (WUS) transmissions from a network node in a radio access network (RAN). Such methods include determining whether a WUS transmission, from the network node, is detected during a particular WUS monitoring occasion (WMO). Such methods also include, based on determining that the WUS is detected during the particular WMO, performing one or more first operations during a first time period associated with the particular WMO; and based on determining that the WUS is not detected during the particular WMO, performing one or more second operations during a second time period. Various first and second operations can be performed, with the first and second operations differing in some manner. The first and second time periods can be the same or different. Embodiments also
(Continued)

include complementary methods performed by a network node.

16 Claims, 13 Drawing Sheets

(58) Field of Classification Search
CPC ... H04W 72/0446; H04W 4/70; H04W 24/10; H04W 84/18; H04W 24/02; H04W 72/0453; H04W 48/16; H04W 88/08; H04W 52/0216; H04W 4/021; H04W 74/0833; H04W 76/27
See application file for complete search history.

(56) References Cited

FOREIGN PATENT DOCUMENTS

| WO | WO-2020037319 A1 * | 2/2020 | ........ H04W 52/0229 |
|----|---------------------|--------|------------------------|
| WO | 2020064710 A1 | 4/2020 | |
| WO | 2020064770 A1 | 4/2020 | |

OTHER PUBLICATIONS

"PDCCH-based power saving signal/channel", 3GPP TSG RAN WG1 Meeting #98bis; R1-1910076; Chongqing, China, Oct. 14-20, 2019, pp. 1-21.

"Triggering Adaptation of UE Power Consumption Characteristics", 3GPP TSG-RAN WG1 Meeting #94bis; R1-1811283; Chengdu, China, Oct. 8-12, 2018, pp. 1-12.

"3GPP TS 36.213 V15.3.0", 3rd Generation Partnership Project; Technical Specification Group Radio Access Network; Evolved Universal Terrestrial Radio Access (E-UTRA); Physical layer procedures (Release 15), Sep. 2018, pp. 1-546.

LG Electronics; "UE power consumption reduction by new physical channel in NB-Iot"; R1-1704847, 3GPP TSG RAN WG1 Meeting #88bis; Spokane, USA; Apr. 3-7, 2017; 3 pages.

Communication pursuant to Article 94(3) mailed Apr. 23, 2025 for European Patent Application No. 20700631.3, 7 pages.

* cited by examiner

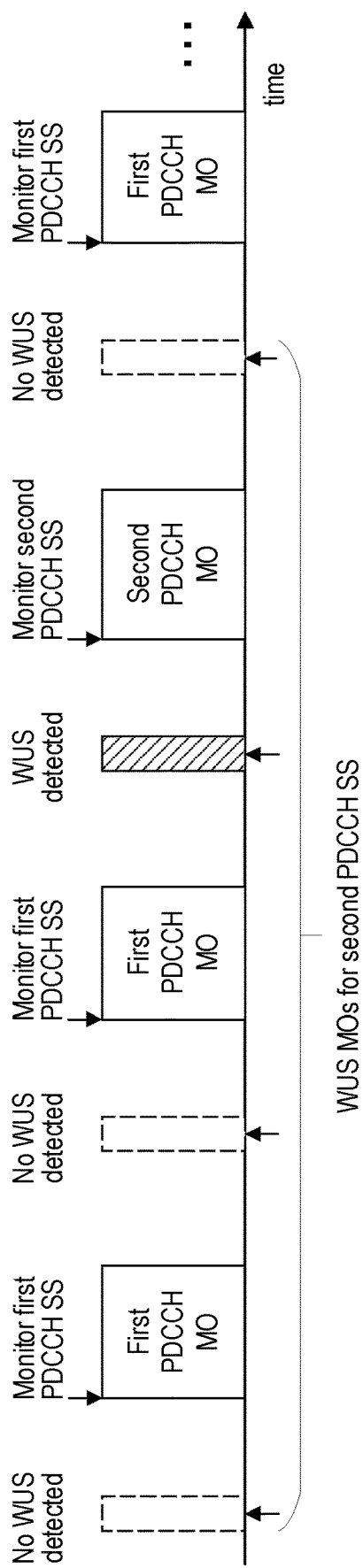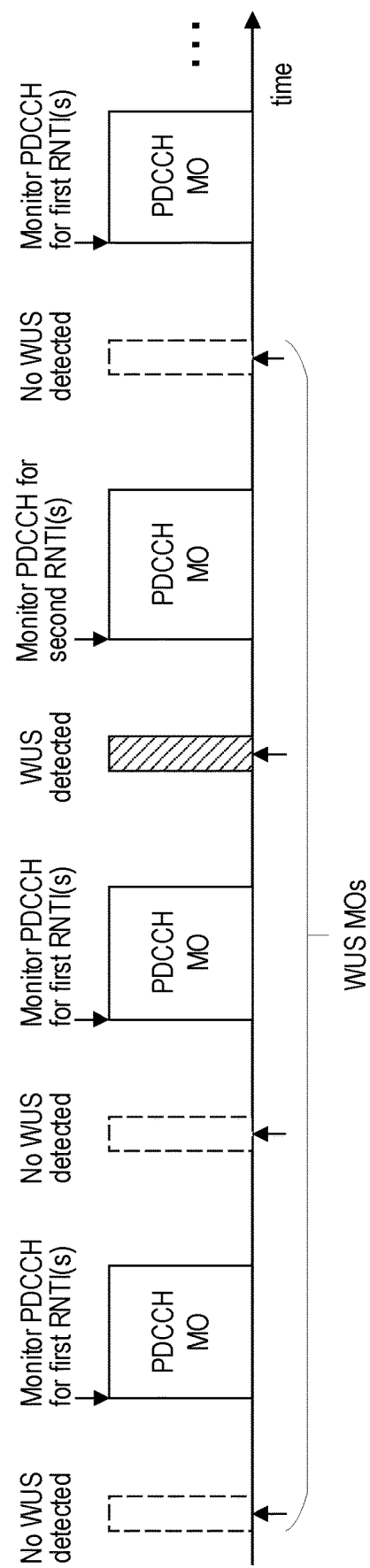
FIG. 9A
FIG. 9B

WAKE-UP SIGNAL (WUS) CONTROLLED ACTIONS

TECHNICAL FIELD

The present invention generally relates to wireless communication networks, and particularly relates to improvements to in wireless device power consumption by use of wake-up signals (WUS).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME.

The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. There were two RRC states defined for an LTE UE. After a UE is powered. ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots $_{2i}$ and $_{2i+1}$. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 4 illustrates one exemplary manner in which the CCEs and REGs can be mapped to a physical resource, e.g., PRBs. As shown in FIG. 4, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be determined based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

In 3GPP, a study item on a new radio interface for 5G has been completed and 3GPP is standardizing this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. Also similar to LTE, NR DL and UL physical resources are organized into equally-sized, time-domain subframes of 1 ms each, with each subframe further divided into multiple slots of equal duration, and with each slot including multiple OFDM-based symbols.

In both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often, and/or allow a UE to wake up less frequently can be beneficial.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for performing different operations based on detection of a wake-up signal (WUS) transmitted by a network node in a radio access network (RAN). These exemplary methods can be performed by a user equipment (UE, e.g., wireless device, IoT device, modem, etc. or component thereof) in communication with a network node (e.g., base stations, eNBs, gNBs, etc., or components thereof) in the RAN (e.g., E-UTRAN, NG-RAN).

These exemplary methods can include determining whether a WUS transmission, from the network node, is detected during a particular WMO. These exemplary methods can also include, based on determining that the WUS is detected during the particular WMO, performing one or more first operations during a first time period associated with the WMO. These exemplary methods can also include, based on determining that the WUS is not detected during the particular WMO, performing one or more second operations during a second time period. In various embodiments, the second time period can be the same as or different from the first duration.

In some embodiments, the first time period can comprise one or more timeslots, each timeslot associated with a respective first operation. In such embodiments, performing the first operations, during the one or more timeslots, can be further based on whether the first operations are permitted during their respective associated timeslots.

In some embodiments, the first time period comprises one of the following: a discontinuous reception (DRX) On duration; a first number of timeslots beginning at a second number of timeslots after a timeslot including the particular WMO; or M timeslots of every N consecutive timeslots after the timeslot including the particular WMO, where M<N.

In some embodiments, the first operations conditionally performed during the first time period can include monitoring a first physical downlink control channel (PDCCH) search space for PDCCH candidates, and the second operations conditionally performed during the second time period can include monitoring a second PDCCH search space for PDCCH candidates. In such embodiments, the first time period can the same as the second time period. In various embodiments, the second PDCCH search space can be a subset of, partially overlapping with, or non-overlapping with the first PDCCH search space.

In other embodiments, the first operations conditionally performed during the first time period can include monitoring a PDCCH search space for PDCCH candidates whose downlink control information (DCI) cyclic redundancy check (CRC) is scrambled by any of a first set of identifiers. Likewise, the second operations conditionally performed during the second time period can include monitoring the PDCCH search space for PDCCH candidates whose DCI CRC is scrambled by any of a second set of identifiers. For example, such identifiers can be various types of RNTIs that are associated with the UE. Furthermore, in some embodiments, the first set of identifiers and second set of identifiers differ by at least one identifier. For example, the first set of identifiers can include a cell radio network temporary identifier (C-RNTI) associated with the UE, and the second set of identifiers can exclude the C-RNTI.

In some embodiments, the first and second operations can include performing at least one of the following: channel state information (CSI) measurements; radio resource management (RRM) measurements; and radio link management (RLM) measurements. In such embodiments, the first operations can be performed based on a first configuration for the measurements, and the second operations can be performed based on a second configuration for the measurements. In such embodiments, the first time period can be the same as the second time period.

In some embodiments, the first operations conditionally performed during the first time period can include transmitting, to the network node during the first time period, one or more of the following group: sounding reference signals (SRS), and channel state information (CSI). Likewise, the second operations conditionally performed during the second time period can include refraining from transmitting any of said group during the second time period. In such embodiments, the first time period can be the same as the second time period.

In some embodiments, the first operations conditionally performed during the first time period can include transmitting an acknowledgement (WUS-ACK) during the first time period, e.g., indicating that the WUS was correctly detected. In such embodiments, the first time period is before monitoring for a subsequent PDCCH transmission. Likewise, the second operations conditionally performed during the second time period can include monitoring a second PDCCH search space for PDCCH candidates (mentioned above). In such embodiments, the second time period can be different than the first time period.

In some embodiments, these exemplary methods can also include, based on determining that the WUS is detected during the particular WMO, receiving scheduling information in the WUS for a subsequent PDSCH transmission. In some embodiments, these exemplary methods can also include, based on determining that the WUS is detected during the particular WMO, receiving configuration information, with the WUS, related to at least one of the following: the first operations, the second operations, the first time period, and the second time period. For example, a WUS-DCI (e.g., command) can indicate a plurality of states, with each state used to control a different aspect of the first operations, the second operations, the first time period, and/or the second time period.

Other exemplary embodiments of the present disclosure include methods (e.g., procedures) for performing different operations based on the result of user equipment (UE) detection of a wake-up signal (WUS). The exemplary method and/or procedure can be performed by a network node (e.g., base station, eNB, gNB, etc., or component thereof) of a radio access network (RAN, e.g., E-UTRAN, NG-RAN), in communication with the one or more UEs (e.g., wireless devices, IoT devices, modems, etc. or components thereof).

These exemplary methods can include can transmitting a WUS to the UE during a particular WMO for the UE. In some embodiments, transmitting the WUS can also include transmitting, with the WUS, scheduling information for a subsequent PDSCH transmission. In some embodiments, transmitting the WUS can include transmitting, with the WUS, configuration information related to at least one of the following: the first operations, the second operations, the first time period, and the second time period. The relevance of these features is explained in more detail below.

These exemplary methods can also include determining whether the UE detected the transmitted WUS. In some embodiments, these operations can include receiving a WUS acknowledgement (WUS-ACK) from the UE, indicating that the UE detected the WUS during the particular WMO.

These exemplary methods can also include, based on determining that the UE detected the WUS, performing one or more first operations during a first time period associated with the WMO. These exemplary methods can also include, based on determining that the UE did not detect the WUS, performing one or more second operations during a first time period. In various embodiments, the second time period can be the same as or different than the first time period.

In some embodiments, the first time period comprises one of the following: a discontinuous reception (DRX) On duration; a first number of timeslots beginning at a second number of timeslots after a timeslot including the particular WMO; or M timeslots of every N consecutive timeslots after the timeslot including the particular WMO, where M<N.

In some embodiments, the first operations conditionally performed during the first time period can include transmitting, to the UE, a physical downlink control channel (PDCCH) in a first PDCCH search space. Likewise, the second operations conditionally performed during the second time period can include transmitting, to the UE, a PDCCH in a second PDCCH search space. In such embodiments, the first time period can the same as the second time period. In various embodiments, the second PDCCH search space can be a subset of, partially overlapping with, or non-overlapping with the first PDCCH search space.

In some embodiments, the first operations conditionally performed during the first time period can include transmit, to the UE, a physical downlink control channel (PDCCH) whose downlink control information (DCI) cyclic redundancy check (CRC) is scrambled by any of a first set of identifiers. Likewise, the second operations conditionally performed during the second time period can include transmitting, to the UE, a PDCCH whose DCI CRC is scrambled by any of a second set of identifiers. In such embodiments, the first time period can be the same as the second time period. Furthermore, in some embodiments, the first set of identifiers and second set of identifiers differ by at least one identifier. For example, the first set of identifiers can include a cell radio network temporary identifier (C-RNTI) associated with the UE, and the second set of identifiers can exclude the C-RNTI.

In some embodiments, the first operations conditionally performed during the first time period can include receiving, from the UE during the first time period, one or more of the following group: sounding reference signals (SRS), and channel state information (CSI). Likewise, the second operations conditionally performed during the second time period can include refraining from monitoring, during the second time period, for transmission by the UE of any of said group. In such embodiments, the first time period can be the same as the second time period.

In some embodiments, the first operations conditionally performed during the first time period can include receive an acknowledgement (WUS-ACK) from the UE during the first time period, e.g., indicating that the WUS was correctly detected. In such embodiments, the first time period is before transmitting a PDCCH to the UE. Likewise, the second operations conditionally performed during the second time period can include transmitting, to the UE during the second time period, a PDCCH in a second PDCCH search space. In such embodiments, the second time period can be different than the first time period.

Other exemplary embodiments include user equipment (UEs, e.g., wireless devices, IoT devices, or components thereof, such as a modem) or network nodes (e.g., radio base station(s), eNBs, gNBs, CUs/DUs, controllers, etc.) configured to perform operations corresponding to any of the exemplary methods described herein. Other exemplary embodiments include non-transitory, computer-readable media storing program instructions that, when executed by processing circuitry, configure such UEs or network nodes to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 9, which includes FIGS. 9A and 9B, shows two exemplary timelines of WUS monitoring occasions (WMOs) and physical downlink control channel (PDCCH) monitoring occasions, according to various exemplary embodiments of the present disclosure.

DETAILED DESCRIPTION

Figure 1:
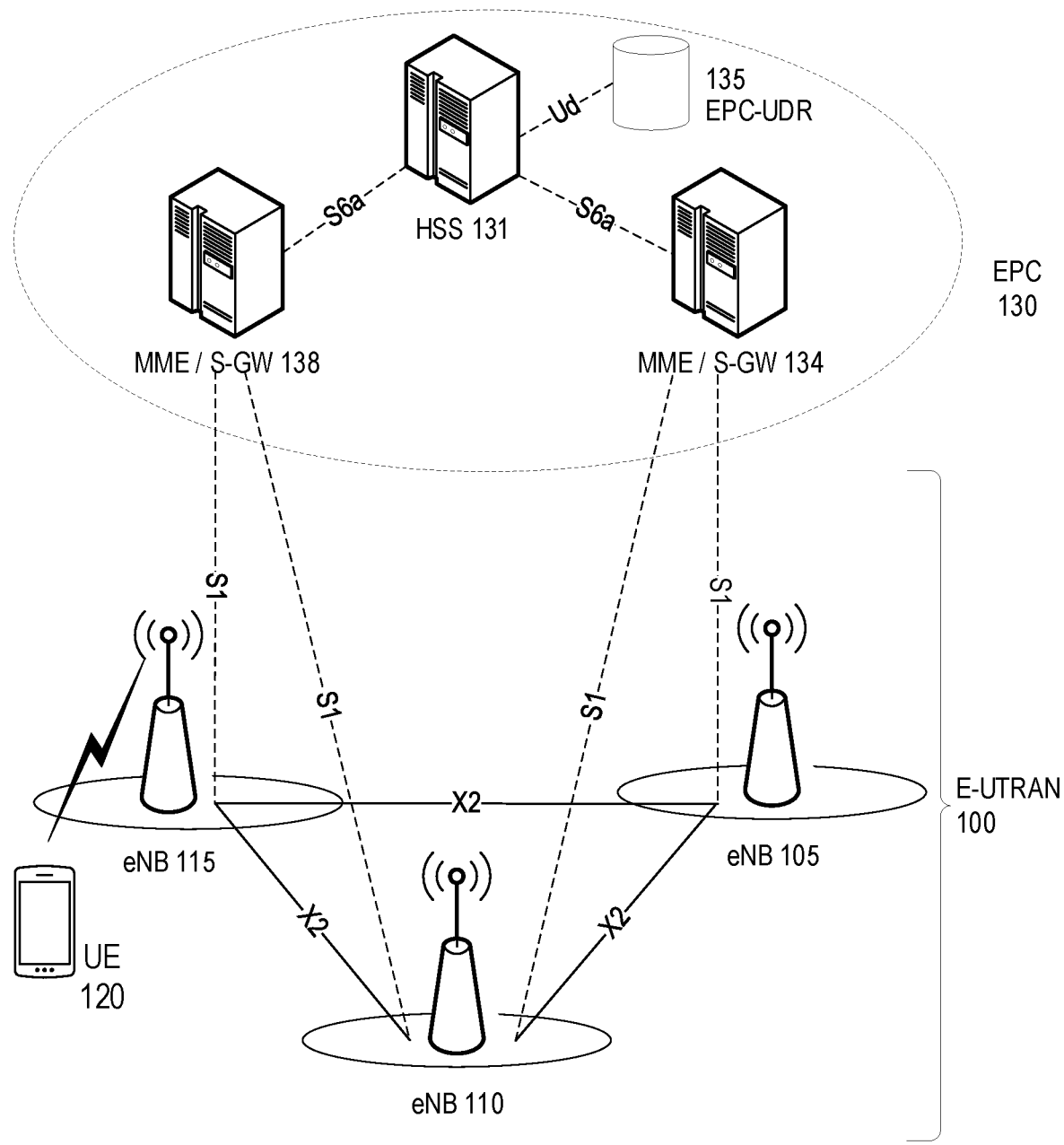
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
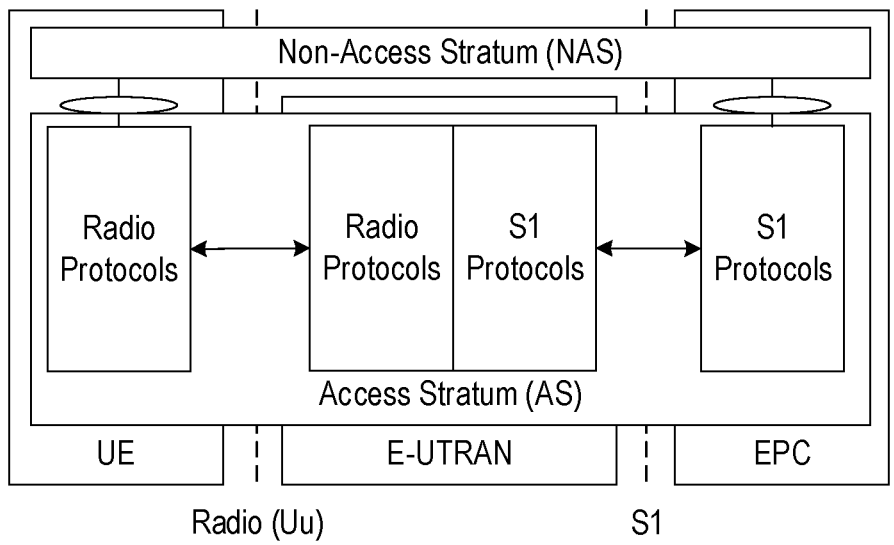
FIG. 2A is a high-level block diagram of an exemplary E-UTRAN architecture in terms of its constituent components, protocols, and interfaces.
Figure 2B:
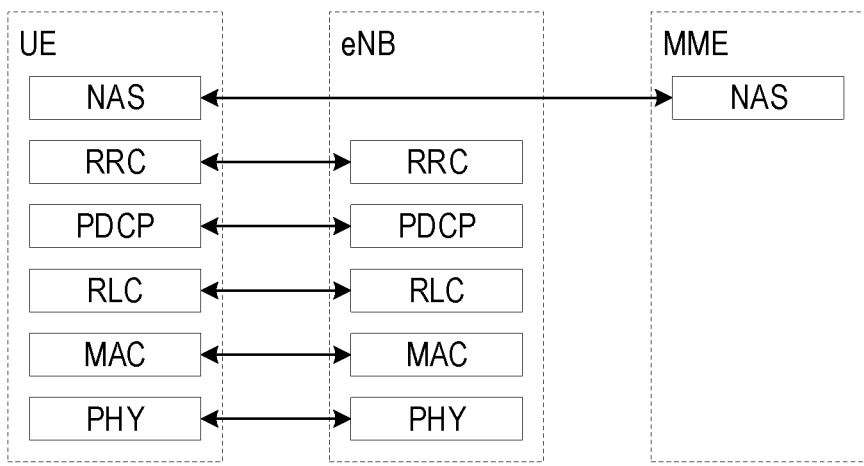
FIG. 2B is a block diagram of exemplary protocol layers of the control-plane portion of the radio (Uu) interface between a user equipment (UE) and the E-UTRAN.
Figure 2C:
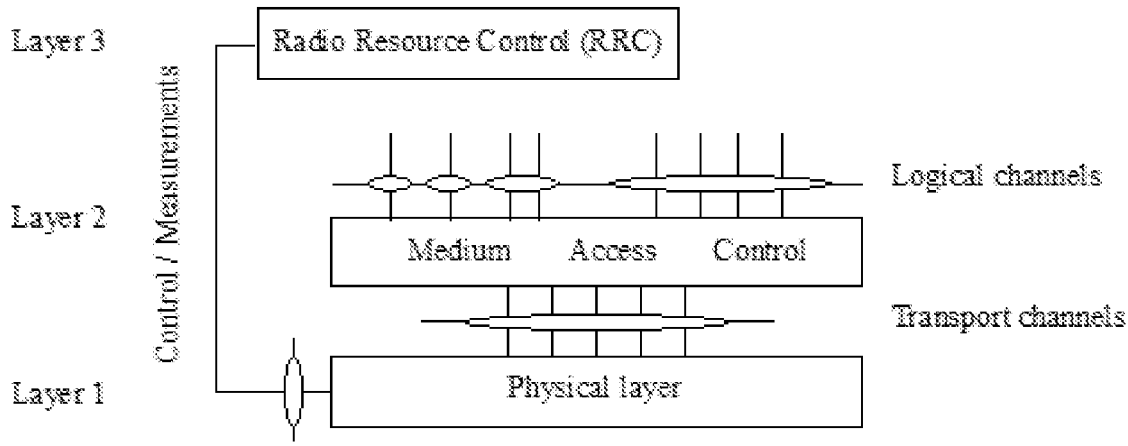
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G/NR) beams may be used instead of cells and, as such, concepts described herein apply equally to both cells and beams.

As briefly mentioned above, in both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, a UE may spend a substantial part of its energy on decoding PDCCH without detecting a DL scheduling assignment or UL resource grant in both LTE and NR. These issues, drawbacks, and/or problems are discussed in more detail below, along with various novel techniques that can reduce unnecessary PDCCH monitoring, allow UE to go to sleep more often, and/or allow the UE to wake up less frequently.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

In Rel-15 NR, a UE can be configured with up to four carrier bandwidth parts (BWPs) in the downlink (DL) with a single DL carrier BWP being active at a given time. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

Figure 5:
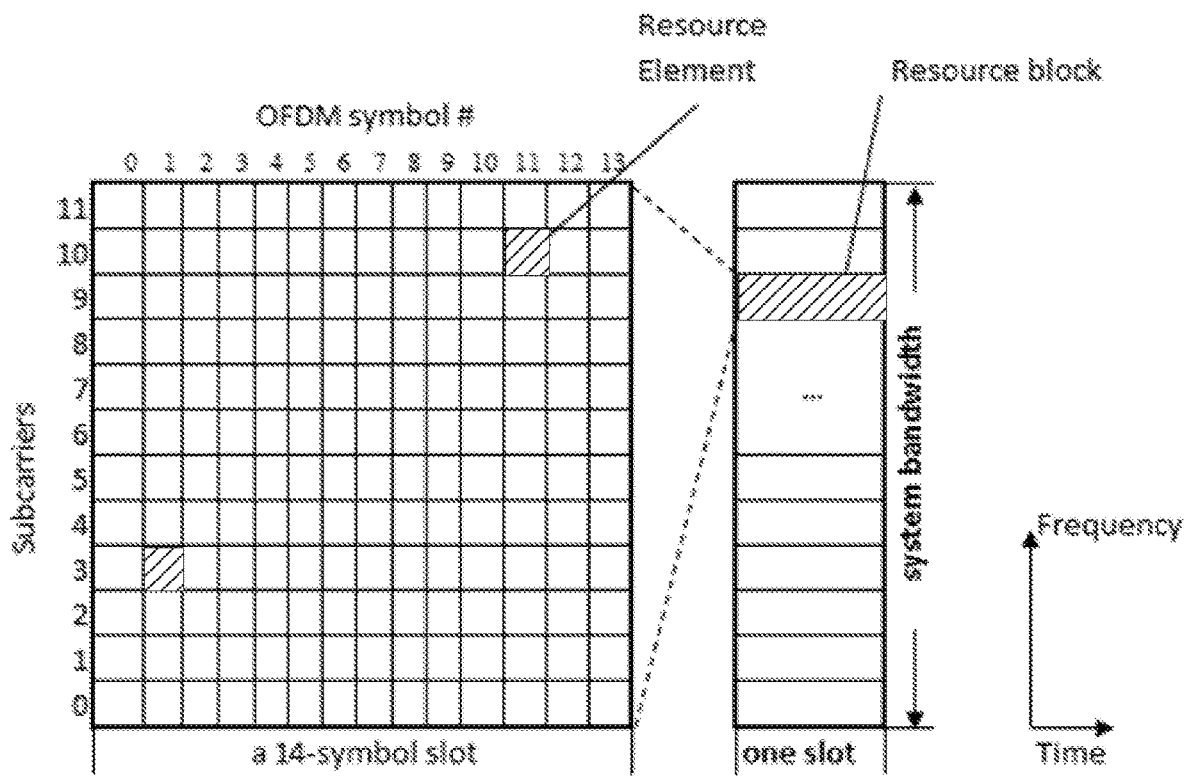
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^\mu)$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $1/2^\mu$ ms. For example, there is one (1-ms) slot per subframe for Δf=15 kHz, two 0.5-ms slots per subframe for Δf=30 kHz, etc. In addition, the RB bandwidth is directly related to numerology according to $2^\mu * 180$ kHz.

Table 1 below summarizes the supported NR numerologies and associated parameters. Different DL and UL numerologies can be configured by the network.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 6A:
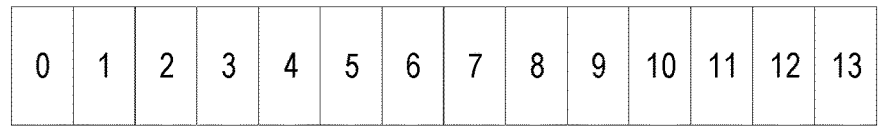
FIGS. 6A-6B shows various exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
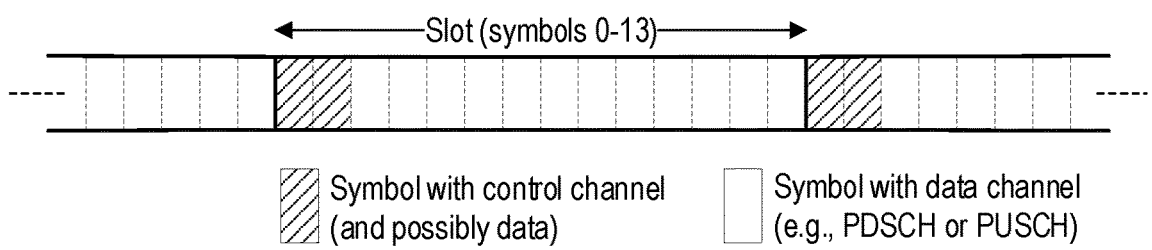

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
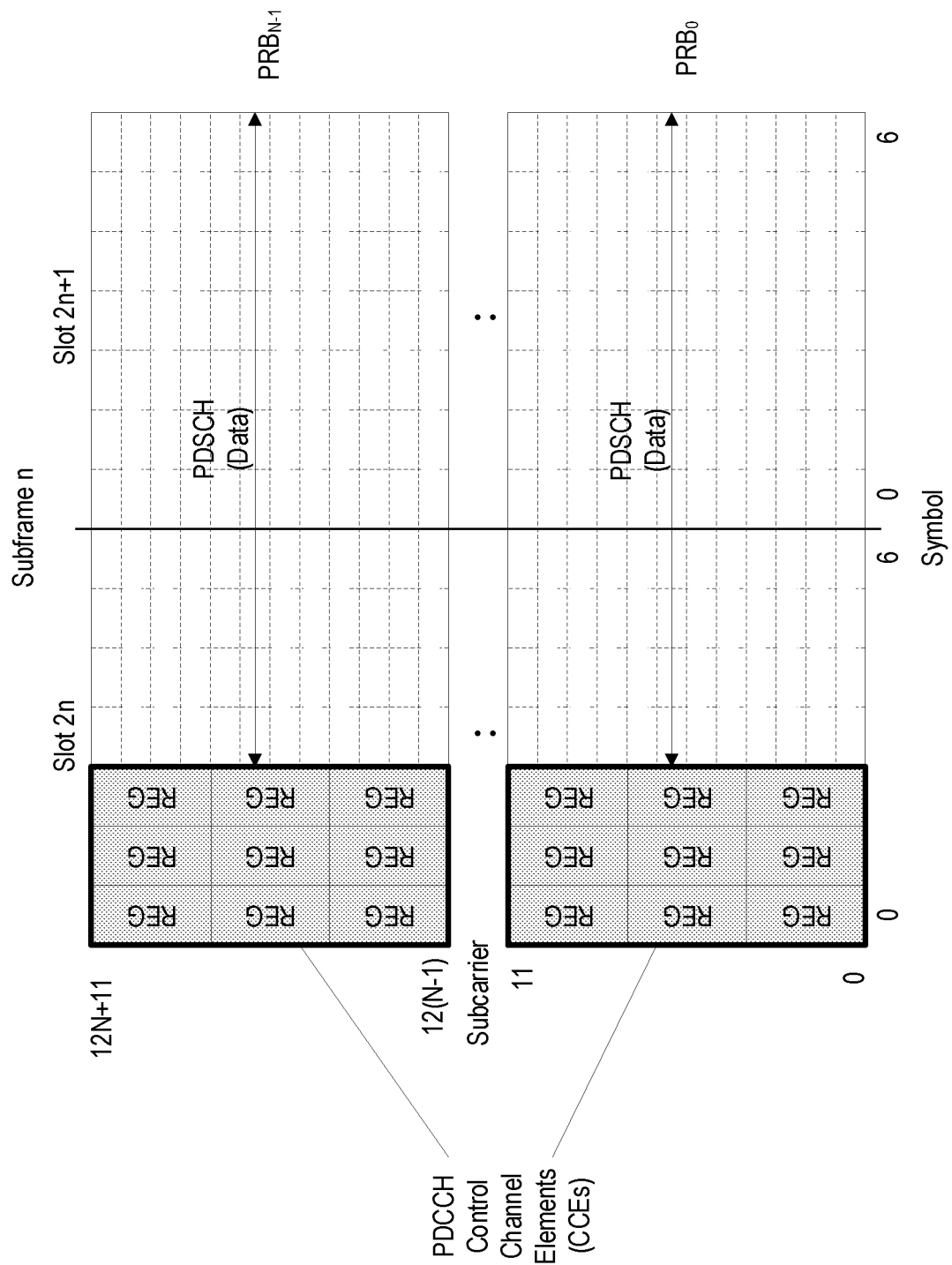
FIG. 4 shows an exemplary manner in which a physical downlink control channel (PDCCH) can be mapped to a physical resource.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in an RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodic TriggeringOffset represents the integer number of slots between the UE's reception of a DCI including a CSI request and the network's transmission of the CSI-RS. This parameter can take on values 0-4.

In RRC_CONNECTED mode, a UE monitors PDCCH for scheduled PDSCH/PUSCH and for other purposes. It is known that for LTE, depending on DRX setting, a UE may spend a substantial part of its energy on decoding PDCCH without detecting a PDSCH/PUSCH scheduled for it. The situation can be similar in NR if similar DRX settings with traffic modelling are utilized, since the UE will still need to perform blind detection in its CORESETs to identify whether there is a PDCCH targeted to it.

Techniques that can reduce unnecessary PDCCH monitoring or allowing UE to go to sleep or wake-up only when required can be beneficial. One such technique methods is to send Wake-up Signal (WUS) that can be detected by the UE with expending much less energy as compared to PDCCH detection. When a UE detects a WUS targeted to it, the UE will wake up and activate the conventional PDCCH decoder.

One disadvantage of WUS is lack of detection robustness. If the UE fails to detect a WUS, this will cause the network (i.e., the gNB transmitting the WUS/PDCCH) to waste constrained PDCCH resources until it discovers that the UE is inactive. In addition, this missed WUS detection leads to additional latency in delivery of the PDCCH payload to the UE. However, increasing the likelihood of detection can also increase the likelihood of false detection, which cause the UE to consume energy through unnecessary activation of the PDCCH decoder. As such, it can be beneficial to develop mechanisms to reduce this latency and waste of 5G network resources without increasing the likelihood of false WUS detection. It can also be beneficial to trigger certain operations based on detected WUS for enabling more efficient network operation, such as early CSI reporting, monitoring a subset of search spaces, etc. These issues are discussed in more detail below.

Figure 7:
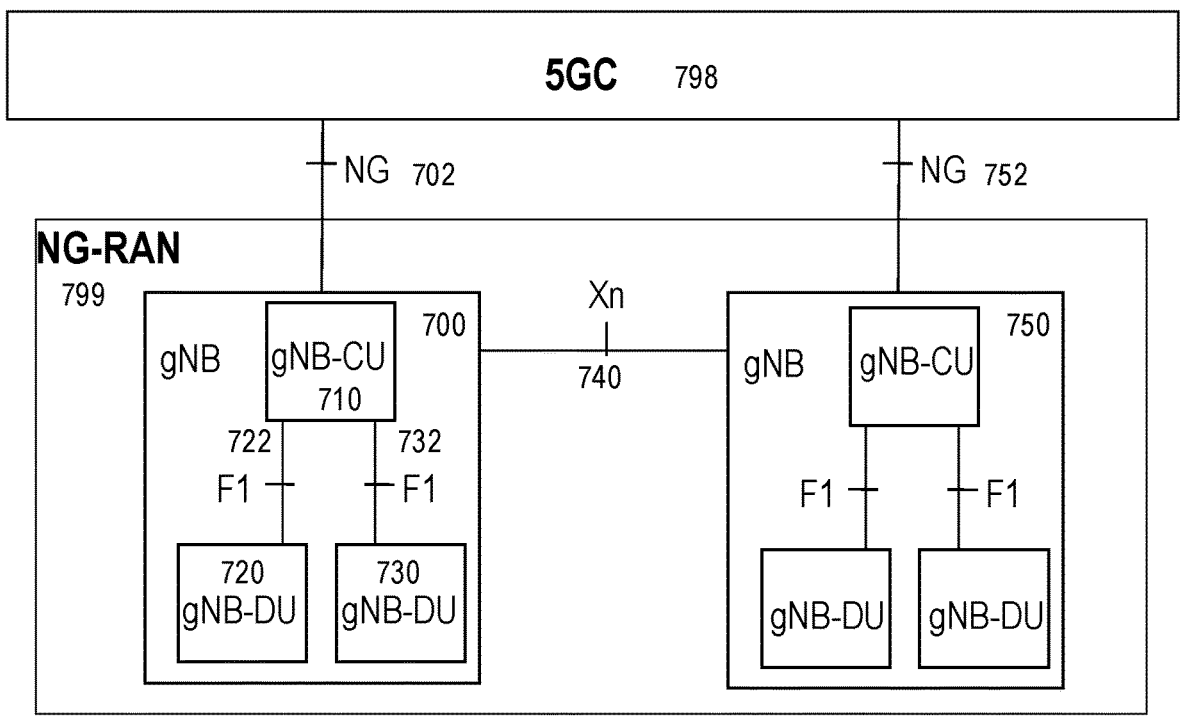
FIGS. 7-8 show two different views of an exemplary 5G network architecture.
Figure 8:
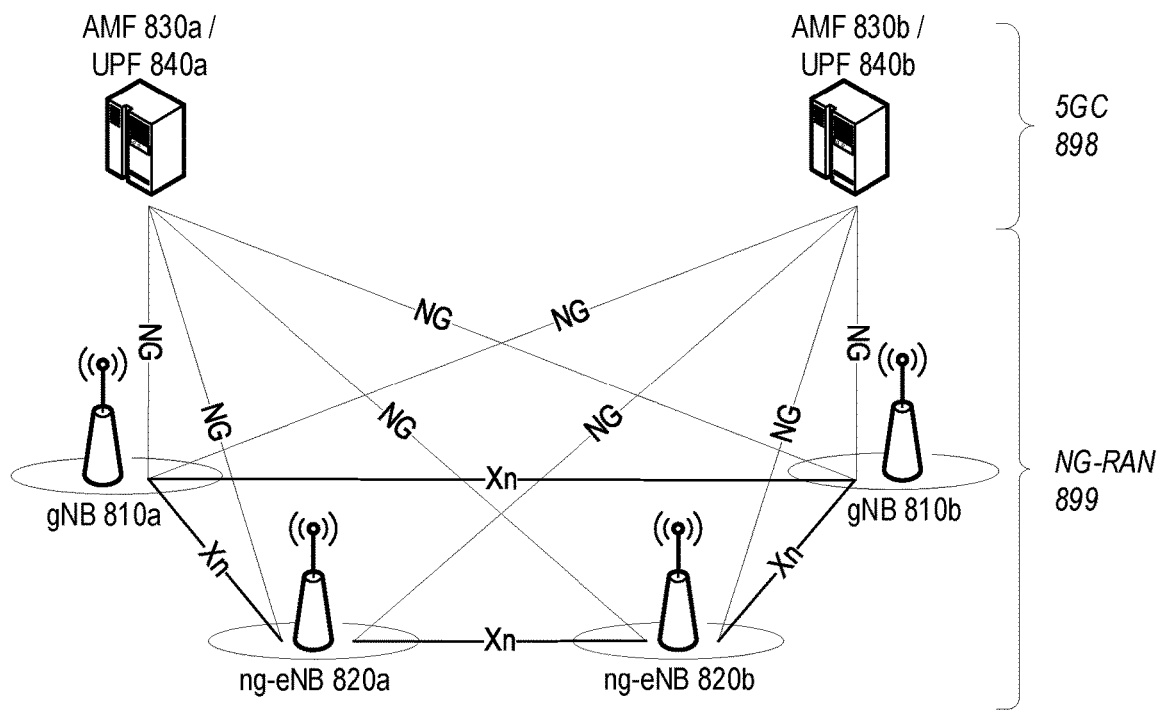

FIG. 7 illustrates a high-level view of the 5G network architecture, consisting of a Next Generation RAN (NG-RAN) 799 and a 5G Core (5GC) 798. NG-RAN 799 can include a set of gNodeB's (gNBs) connected to the 5GC via one or more NG interfaces, such as gNBs 700, 750 connected via interfaces 702, 752, respectively. In addition, the gNBs can be connected to each other via one or more Xn interfaces, such as Xn interface 740 between gNBs 700 and 750. With respect to the NR interface to UEs, each of the gNBs can support frequency division duplexing (FDD), time division duplexing (TDD), or a combination thereof.

The NG RAN logical nodes shown in FIG. 7 (and described in TS 78.401 and TR 78.801) include a central (or centralized) unit (CU or gNB-CU) and one or more distributed (or decentralized) units (DU or gNB-DU). For example, gNB 700 in FIG. 7 includes gNB-CU 710 and gNB-DUs 720 and 730. CUs (e.g., gNB-CU 710) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
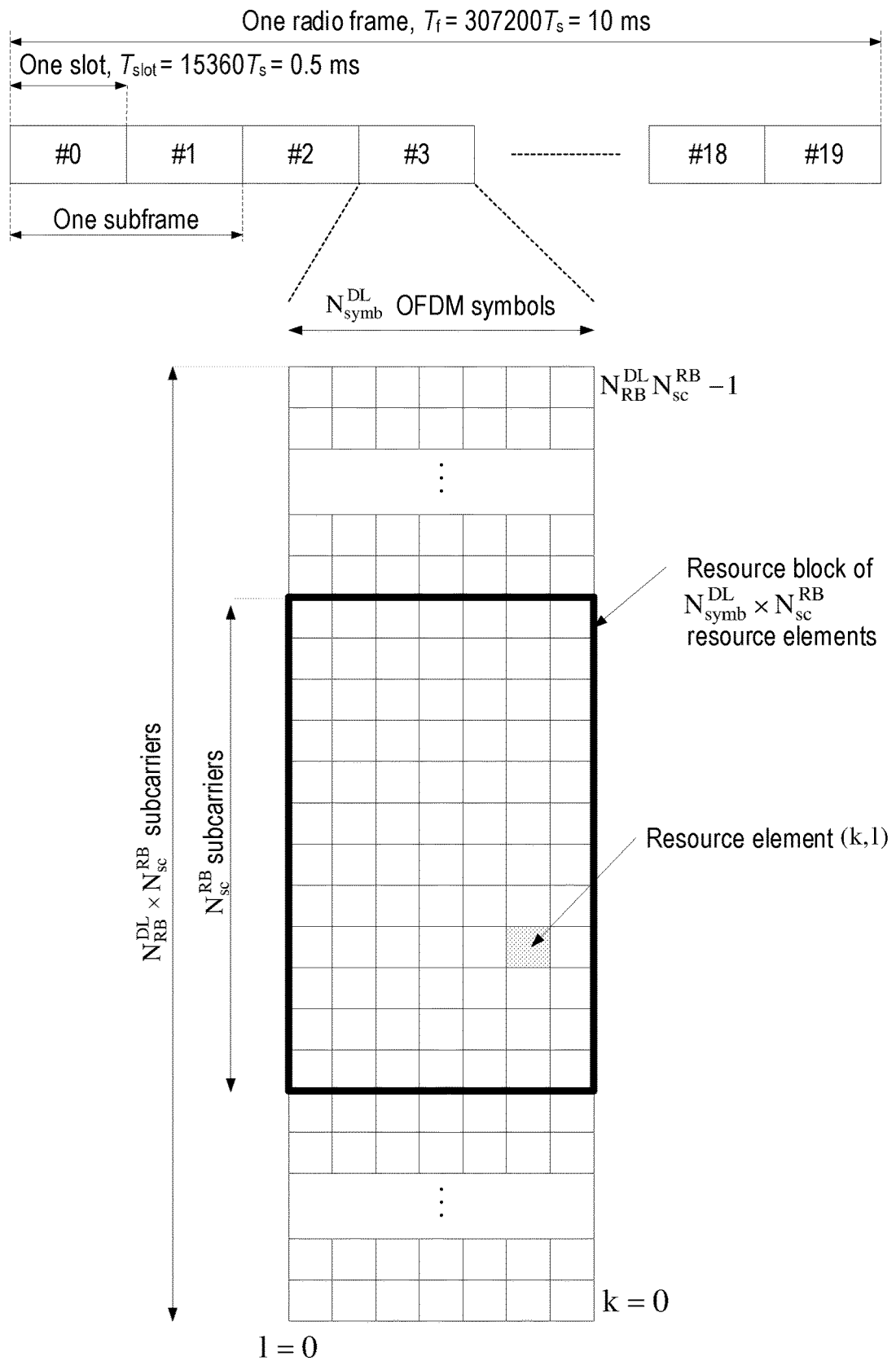
FIGS. 3A and 3B are block diagrams, respectively, of exemplary downlink and uplink LTE radio frame structures used for frequency division duplexing (FDD) operation.
Figure 3B:
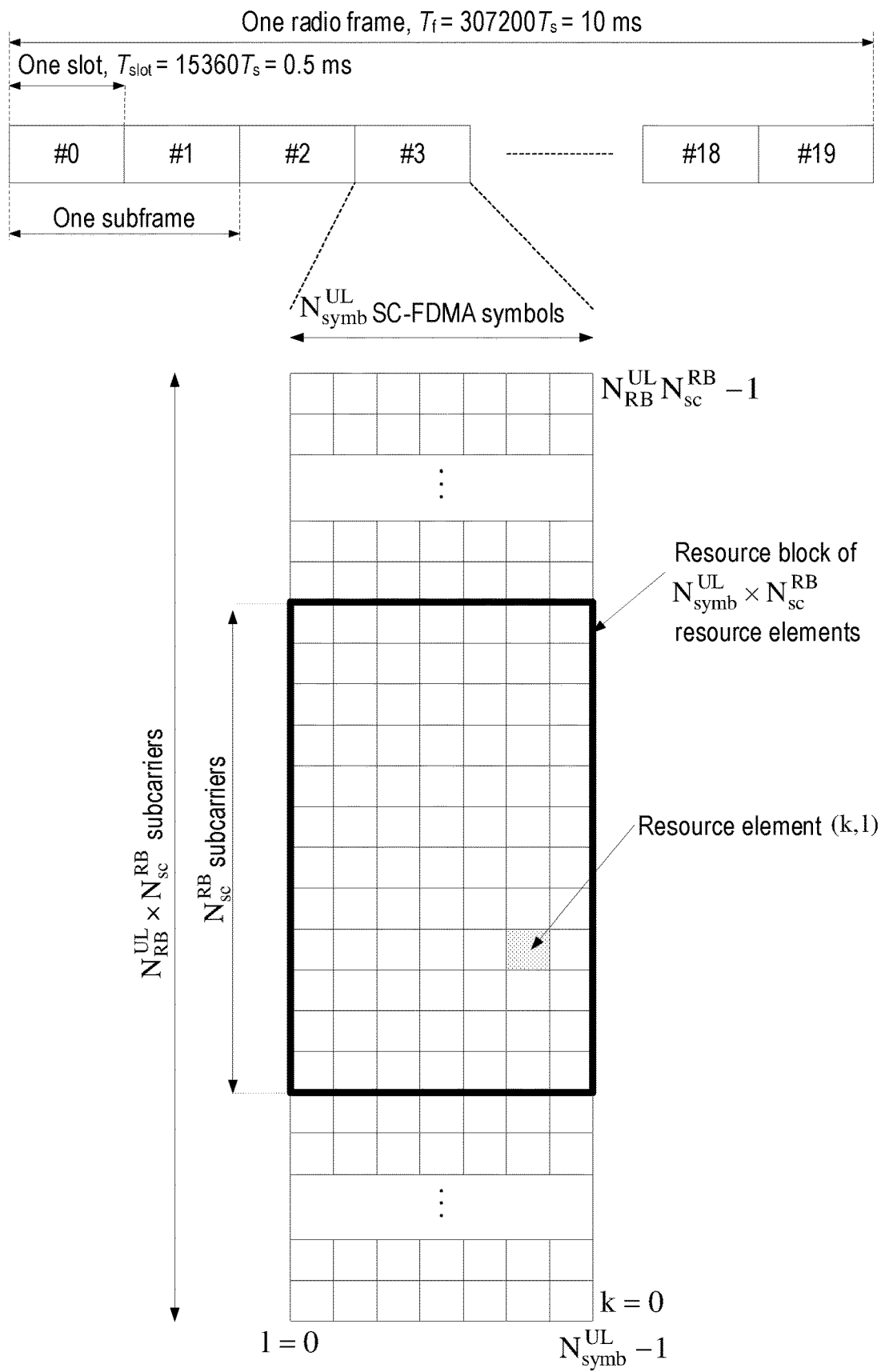

A gNB-CU connects to gNB-DUs over respective F1 logical interfaces, such as interfaces 722 and 732 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Returning to the above discussion about WUS and PDCCH, a wake-up-DCI (WU-DCI) is a DCI transmission on a regular PDCCH that does not schedule PDSCH/PUSCH data or carry conventional DL control signaling. The CRC may be scrambled with the C-RNTI of the targeted UE or a WUG-RNTI (wake-up group RNTI) with which the UE has been configured. For example, when a UE is configured with a WUG-RNTI it belongs to this specific WU-group and can be awakened by a DCI addressed to this WUG-RNTI. A UE can also be configured to monitor WUS with either C-RNTI or WUG-RNTI.

In such case, the WU-DCI can carry dummy data and a targeted UE receives the WU message by a successful CRC check using its C-RNTI or an assigned WUG-RNTI. Alternatively, the WU-DCI may also carry additional information to the targeted UE, or a UE group, to instruct the UE to perform some subsequent action. The search space for WU-DCI may be common or UE-specific. To reduce UE blind decoding attempts and resulting energy, the search space(s) where WUS-DCI can be transmitted are typically very limited so that UE only has to test for one, or a small number of, RE hypothesis(es).

Even within WUS search spaces limited in such ways, the UE can still fail to detect a WUS directed to it (or to a group of which it is a member). If this occurs, the UE will not wake up to receive the associated PDCCH that will be transmitted by the network (e.g., serving gNB). As such, the network will waste resources transmitting the PDCCH to a UE that is not listening. The network will eventually discover this problem and retransmit the PDCCH information (e.g., accompanied by another WUS), but this requires additional network resources and results in latency or delay in delivery of the PDCCH payload to the UE. Moreover, this can also delay operations that the UE performs in response to receiving the WUS and/or PDCCH, such as transmitting reference signals.

Accordingly, exemplary embodiments of the present disclosure address these and other problems, issues, and/or drawbacks by providing fallback mechanisms for the network in case a UE fails to detect a WUS intended for it. Embodiments also facilitate more efficient network operation by configuring the UE to perform a specific set of actions based on WUS detection result and/or outcome. For example, a particular WUS monitoring occasion (and/or a WUS within that occasion) may be associated with PDCCH monitoring for a first search space but not with PDCCH monitoring for a second search space. UE detection of WUS in the WUS monitoring occasion (WMO) can trigger a specific set of UE actions UE during one or more time periods associated with that WMO.

In some embodiments, a UE can be configured with a set of WUS monitoring occasions (WMOs) in time slots n, n+Pw, n+2Pw, etc. For example, these configured WMOs can be periodic. For a particular WMO in the set of configured WMOs, the UE determines a corresponding PDCCH monitoring occasion. The PDCCH monitoring occasion can be, for example, a DRX ON (or active) duration. The UE skips (e.g., refrains from) PDCCH monitoring in the determined PDCCH monitoring occasion if the UE does not detect a WUS in the corresponding WMO. The UE's determination whether to skip PDCCH monitoring can also depend on other conditions and/or operations, such the result of comparison of a signal metric (e.g., RSRP, RSRQ, etc.) against a threshold.

In some embodiments, upon failing to detect the WUS in the configured WMO, the UE can skip PDCCH monitoring for a first search space but continue PDCCH monitoring for a second search space. The UE can be configured to monitor the first and second search spaces with different periodicity. For example, the UE can be configured to monitor PDCCH candidates of the first search space with periodicity P1 (e.g., in slots n, n+P1, n+2P1, etc.) and to monitor PDCCH candidates of the second search space with periodicity P2 (e.g., in slots n, n+P2, n+2P2 etc.). P2 can be greater than or less than P1 (e.g., P1=k*P2, where k>1). In different variants, the second search space can correspond to a default search space, a UE-specific search space, or common search space.

FIGS. 9A and 9B show two exemplary timelines of WMOs and PDCCH monitoring occasions, according to various exemplary embodiments of the present disclosure. In the configuration shown in FIG. 9A, the UE is configured with first and second PDCCH search spaces and with a plurality of WMOs (e.g., periodic WMOs). In this case, when the UE detects a WUS during a WMO, the UE subsequently monitors PDCCH in the second search space for a particular duration starting at a PDCCH monitoring occasion (also referred to as "second PDCCH monitoring occasion"). This duration can be predetermined or configured along with the WMOs. For example, if the UE detects WUS in a WMO, the UE can be configured to monitor and/or detect PDCCH in the second search space in a duration of X slots. In some embodiments, the duration can be an DRX active duration.

In the example shown in FIG. 9A, the UE is further configured to monitor PDCCH in the PDCCH monitoring occasions associated with the first search space (also referred to as "first PDCCH monitoring occasions"), when the UE does not detect a WUS during a WMO associated with the second PDCCH search space. The durations associated with these first PDCCH monitoring occasions can be configured to be the same as, or different from, the durations associated with the second PDCCH monitoring occasions. In this manner, the network can communicate with the UE via the PDCCH in the first search space even if the UE frequently and/or consistently fails to detect the WUS associated with the second PDCCH search space.

The frequency and/or duration of the UE's monitoring of the first PDCCH search space can be configurable by the network. For example, the UE can be configured monitor the first PDCCH search space for a first time period, e.g., for one or more DRX on/active durations in a DRX cycle. As another example, the UE can be configured to monitor first PDCCH search space during M of every N slots, where M<N.

In other embodiments, the frequency and/or duration of the UE's monitoring of the first PDCCH search space can be defined relative to the slot comprising the WMO associated with the second PDCCH search space. For example, if WMO is in slot X, then the corresponding slots for monitoring the first PDCCH search space comprise X+A, X+A+1, . . . X+B, where A and B can be pre-determined, pre-configured, and/or configured by higher layers such as MAC, RRC, etc. As an example, A can be 1. In some embodiments, monitoring the first PDCCH search space can be further conditioned on other information, such as SFI (slot format indicator), identifying that the symbols of the PDCCH monitoring occasion are reserved and/or used for purposes other than PDCCH (e.g., uplink transmissions).

Monitoring first and second PDCCH search spaces is just one example of the principles of the present disclosure, whereby the different detection outcomes of a WMO trigger the UE to perform different actions and/or sets of actions during a subsequent time duration associated with the WMO. As another example, upon detection of a WUS during a WMO, the UE can be configured to monitor PDCCH candidates whose DCI CRC is scrambled by a first set of RNTI masks (e.g. C-RNTI, P-RNTI, SI-RNTI, RA-RNTI) during subsequent durations associated with the WMO. On the other hand, upon non-detection of the WUS during the WMO, the UE can be configured to monitor PDCCH candidates whose DCI CRC is scrambled by a second set of RNTI masks (e.g. P-RNTI, SI-RNTI, RA-RNTI but not C-RNTI) during subsequent durations associated with the WMO. In general, the second set can include additional elements not in the first set, and/or omit elements of the first set. FIG. 9B shows an exemplary timeline of WMOs and PDCCH monitoring occasions that illustrates embodiments according to this example.

As another example, upon detection of a WUS during a WMO, the UE can be configured to perform and/or report CSI measurements using a first configuration (e.g., a first set of CSI-RS(s), reporting formats, reporting instances, etc.) during subsequent durations associated with the WMO. On the other hand, upon non-detection of the WUS during the WMO, the UE can be configured to perform and/or report CSI measurements using a second configuration (e.g., a second set of CSI-RS(s), reporting formats, reporting instances, etc.) during subsequent durations associated with the WMO.

As yet another example, upon detection of a WUS during a WMO, the UE can be configured to perform radio resource management (RRM) measurements using a first configuration (e.g., a first set of SSBs, CSI-RSs, and/or serving cells) during subsequent durations associated with the WMO. On the other hand, upon non-detection of the WUS during the WMO, the UE can be configured to perform RRM measurements using a second configuration (e.g., a second set of SSBs, CSI-RSs, and/or serving cells) during subsequent durations associated with the WMO.

As a further example, upon detection of a WUS during a WMO, the UE can be configured to perform radio link monitoring (RLM) using a first configuration (e.g., a first set of timers and/or RS for tracking link quality) during subsequent durations associated with the WMO. On the other hand, upon non-detection of the WUS during the WMO, the UE can be configured to perform RLM using a second configuration (e.g., a second set of timers and/or RS for tracking link quality) during subsequent durations associated with the WMO.

As an even further example, upon detection of a WUS during a WMO, the UE can be configured to perform an uplink transmission during subsequent durations associated with the WMO. The uplink transmission can be sounding RS, PUCCH for scheduling request, etc. On the other hand, upon non-detection of the WUS during the WMO, the UE can be configured to forego and/or omit such uplink transmissions during subsequent durations associated with the WMO.

In other embodiments, the network (e.g., serving gNB) can transmit a WUS prior to one or more PDCCH used to schedule PDSCH transmissions. In such embodiments, to reduce the latency, the network can also include PDSCH scheduling information in the WUS. For example, the WUS can include existing scheduling DCIs (e.g. DCIs 1-0 and 1-1 for downlink) with the K0 offset value, which indicates that the PDSCH is scheduled no earlier than the UE's wake-up time. In such embodiments, the network can configure the UE with a WUS, WMOs, and related resources. In the most aggressive case, the WUS can be transmitted to the UE at any time on a pre-configured resource. The scheduling PDCCH, transmitted after the WUS, can also be viewed as a type of WUS in case the UE does detect the actual WUS transmitted by the network.

Figure 10:
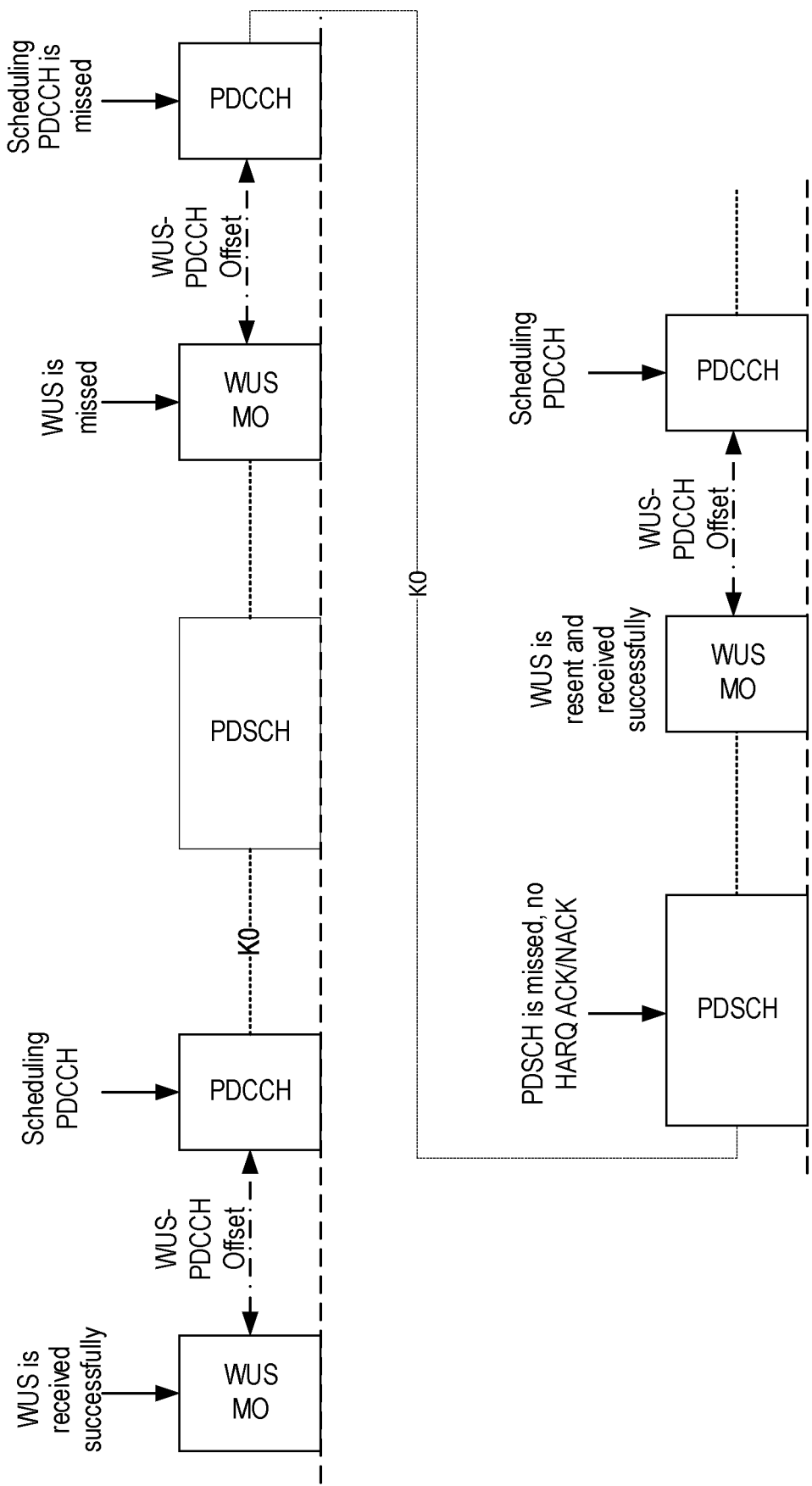
FIGS. 10-11 show two exemplary configurations of WUS transmission in advance of scheduling PDCCH, according to various embodiments of the present disclosure.

FIG. 10 shows an exemplary configuration of WUS transmission in advance of scheduling PDCCH, according to various embodiments of the present disclosure. The UE successfully receives the first WUS and the associated scheduling PDCCH, and subsequently the scheduled PDSCH. The UE fails to detect the second WUS and also misses the subsequent scheduling PDCCH. This informs the network of the missed WUS. The network then transmits the scheduled PDSCH but having missed both the WUS and the scheduling PDCCH, the UE also misses the PDSCH and does not respect with HARQ ACK or NACK. The network the resends the WUS and the subsequent PDCCH, both of which the UE successfully receives.

In variants of these embodiments, if the UE detects a scheduling WUS transmitted in this manner, it can respond with an ACK/NACK (also referred to as "WUS-ACK" or "WUS-NACK"). If the UE does not detect the scheduling WUS, it will not respond and, upon not receiving a response, the network can resend the scheduling WUS during the next WMO. Alternately, or in addition, upon determining while attempting to detect WUS that the link quality is insufficient for WUS detection, the UE can remain or become awake for a predetermined period during which the network can retransmit the scheduling WUS.

With respect to the WUS HARQ embodiments, the network can configure or schedule the UE to send the WUS-ACK/NACK before or at the time of the scheduling PDCCH or, to save uplink resources, in the same resources used to send HARQ ACK/NACK for the scheduled PDSCH. In case the WUS also includes scheduling information, the PDSCH ACK or NACK can be considered as the WUS-ACK. For example, the combined HARQ ACK/WUS-ACK can be sent via uplink control information (UCI) on PUCCH using formats 1, 3, or 4 in order to separate the two feedbacks. In this manner, the UE can remain awake while expecting a retransmission from the network.

For the case of WUS before or at the same time as a scheduling PDCCH, the UE is expected to remain awake if a HARQ retransmission is expected. The UE can return to sleep after receiving successfully all the PDSCHs, after several PDCCH monitoring occasions, after a predetermined duration, and/or based on expiration of an Inactivity timer (TAT). In other embodiments, the UE can remain awake after a WUS until the network commands the UE to go to sleep using a GTS (go-to-sleep) signal sent, e.g., via DCI or MAC CE command.

In embodiments where WUS includes PDCCH-type scheduling information (also referred to as "WUS-DCI"), various techniques can be used to configure the WUS and/or encode the WUS-DCI included therein. In some embodiments, the WUS configuration can be based on similar parameters as PDCCH configurations, including CORESET, search space ID, search space type (e.g., common, UE-specific, UE-group specific), aggregation level (AL) and/or number of candidates, search-space periodicity (e.g., WMOs), RNTI (e.g. UE-specific or UE-group common), and/or DCI format (e.g., 0_0, 1_0, 2 or new compact DCI format).

For example, the RNTI utilized for different blocks of WUS encoding can be different. For example, the RNTI applied on WUS-DCI CRC mask can be explicitly configured by higher layers. The RNTI can be same as the UE's C-RNTI, or different from the C-RNTI, such as a WUG-RNTI. Similar to PDCCH-DCI, the RNTI utilized for identifying (e.g., in the scrambling or hashing function) the WUS candidate can be explicitly configured by the higher layers.

Furthermore, the WUS configuration and/or encoding can also convey information about procedures and/or operations that are dependent on, or controlled by, the UE's WUS detection result for the corresponding WMO. For example, these can include any of the following:

PDCCH monitoring in DRX On duration and associated configuration;
PDCCH monitoring in Search Spaces {a, b, c, d} and associated configuration;
Search spaces monitored in DRX On duration and associated configuration;
CSI measurements and associated configuration;
RRM measurements and associated configuration;
RLM and associated configuration; and
SRS/SR and associated configuration.

In some embodiments, a WUS-DCI (e.g., command) can indicate a plurality of states (e.g. four bits could indicate up to 16 states). In such embodiments, each state can be used to indicate the control of a different procedure and/or operation, such as those discussed above. In other embodiments, if WUS is associated with PDCCH monitoring in a DRX On duration, the WUS configuration can be included in the DRX configuration provided by the network.

Figure 11:
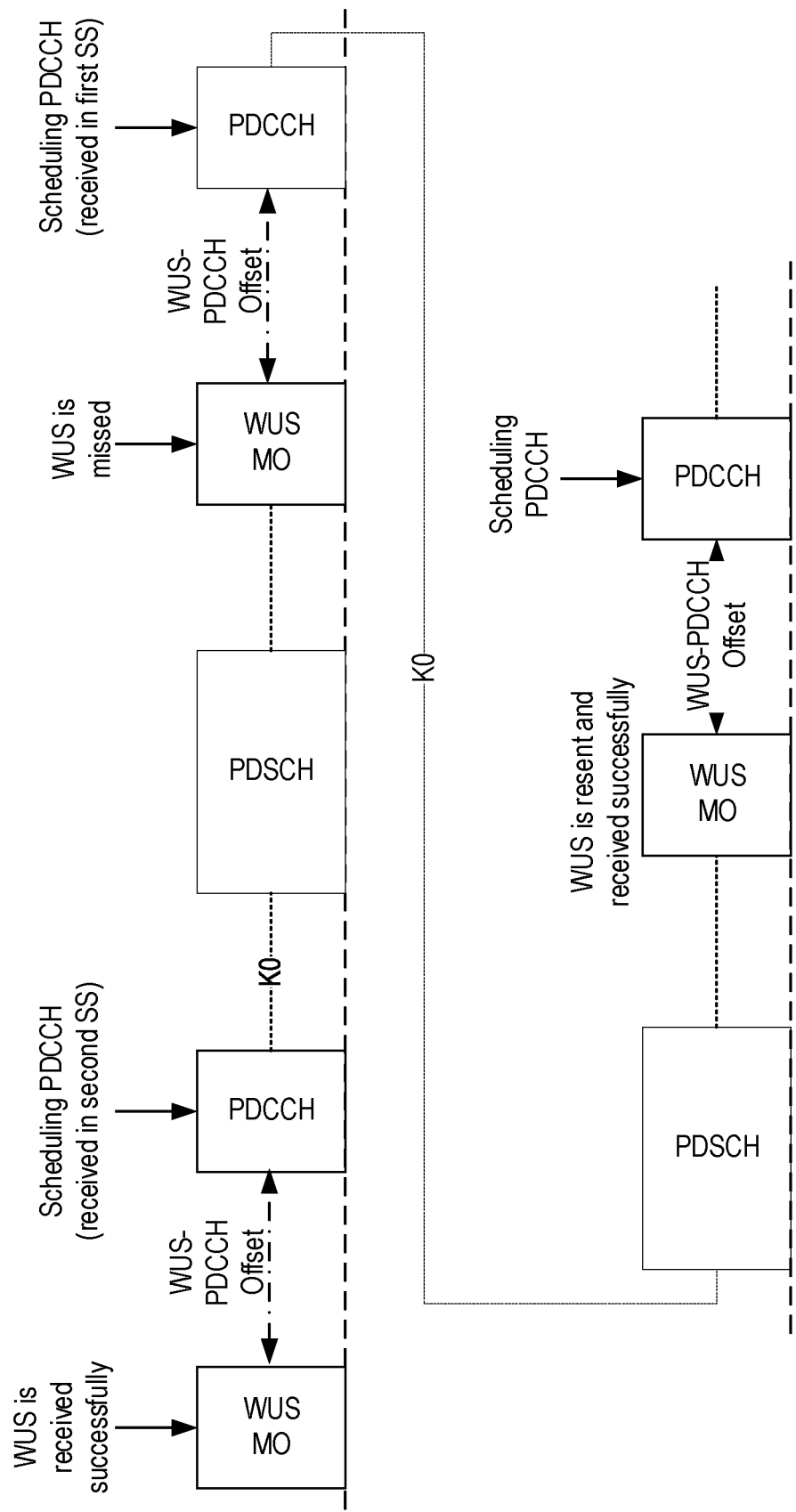

Various embodiments discussed above can also be used in combination. For example, in cases where the network sends a WUS before scheduling PDCCH(s), the UE can be configured to monitor the second PDCCH search space upon WUS detection, and a first PDCCH search space upon WUS non-detection. FIG. 11 shows an exemplary configuration of WUS transmission in advance of scheduling PDCCH, according to various embodiments of the present disclosure. In this scenario, the UE successfully receives the first WUS and the associated scheduling PDCCH in the second PDCCH search space (SS). On the other hand, UE fails to detect the second WUS but stays awake to successfully receive the scheduling PDCCH in the first PDCCH SS. In this manner, even though it failed to detect the WUS, the UE can still successfully receive the scheduled PDSCH transmitted after the scheduling PDCCH.

The embodiments described above can be further illustrated with reference to FIGS. 12-13, which depict exemplary methods (e.g., procedures) performed by a UE and a network node, respectively. In other words, various features of the operations described below with reference to FIGS. 12-13 correspond to various embodiments described above.

Figure 12:
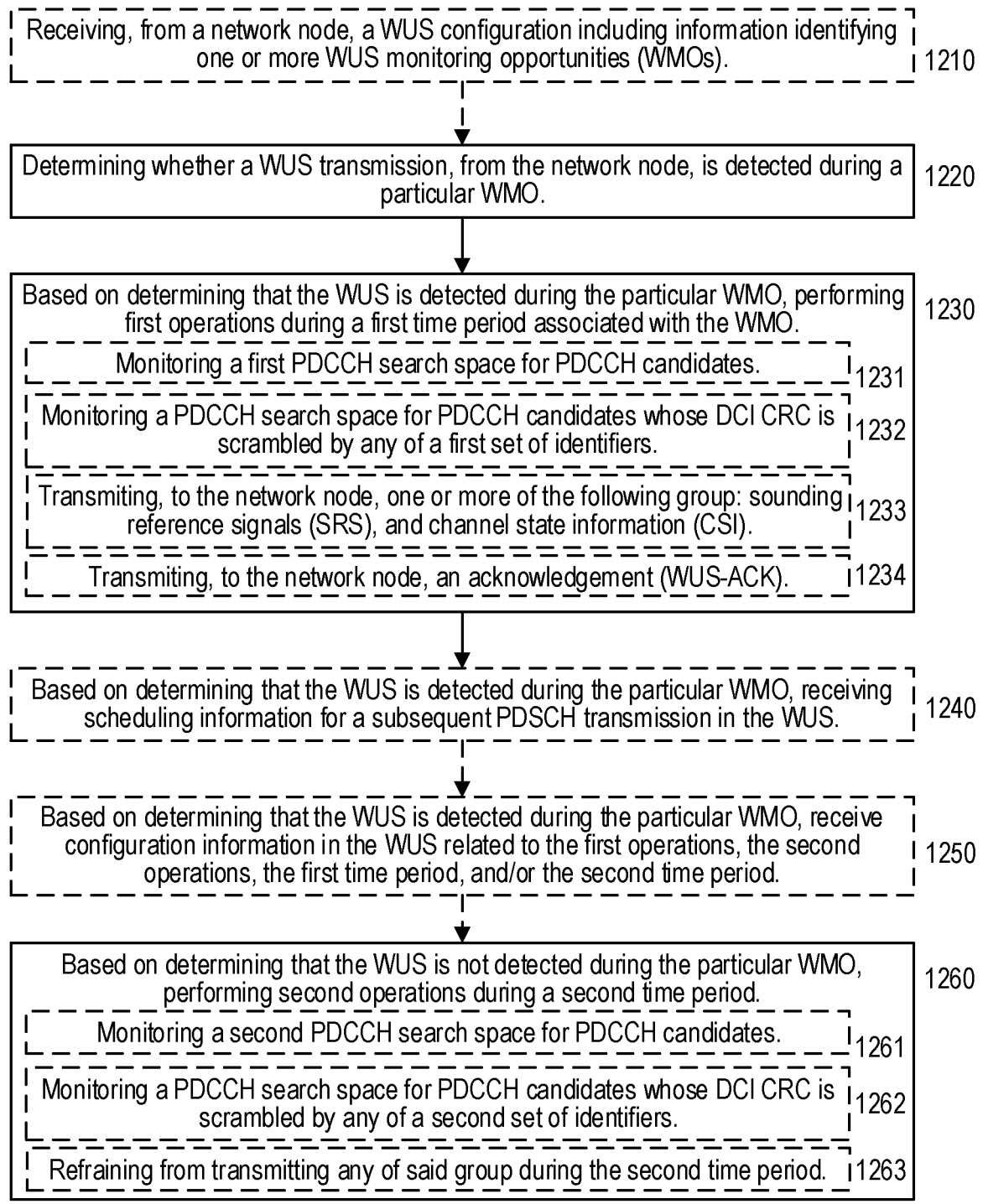
FIG. 12 shows a flow diagram of an exemplary method (e.g., procedure) performed by a user equipment (UE, e.g., wireless device, MTC device, NB-IoT device, modem, etc. or component thereof), according to various exemplary embodiments of the present disclosure.

In particular, FIG. 12 shows a flow diagram of an exemplary method (e.g., procedure) for performing different operations based on detection of a wake-up signal (WUS) transmitted from a network node in a radio access network (RAN), according to various exemplary embodiments of the present disclosure. The exemplary method procedure can be performed by a user equipment (UE, e.g., wireless device, IoT device, modem, etc. or component thereof) in communication with a network node (e.g., base stations, eNBs, gNBs, etc., or components thereof) in the RAN (e.g., E-UTRAN, NG-RAN). For example, the exemplary method shown in FIG. 12 can be implemented in a UE configured as described herein with reference to other figures. Furthermore, the exemplary method shown in FIG. 12 can be used cooperatively with other exemplary methods described herein (e.g., FIG. 13) to provide various exemplary benefits described herein. Although FIG. 12 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1210, where the UE can receive, from the network node, a WUS configuration including information identifying one or more WUS monitoring occasions (WMOs). In some embodiments, the WUS configuration can also include various information associated with a WUS transmission (e.g., during the WMOs), including any of the following:
a CORESET;
a search space type or identifier;
an aggregation level (AL);
one or more radio network temporary identifiers (RNTI); and
downlink control information (DCI) message format associated with scheduling information for a subsequent PDSCH transmission.

The exemplary method can also include the operations of block 1220, where the UE can determine whether a WUS transmission, from the network node, is detected during a particular WMO. In some embodiments, the particular WMO can be one of the WMOs identified in the WUS configuration (e.g., received in block 1210). In other words, the UE can detect the presence or absence of the WUS during the WMO, such as described above. Moreover, detecting the absence of the WUS during the particular WMO can indicate that the WUS was not transmitted by the network node, or that the WUS was transmitted but the UE was unable to receive it (e.g., due to poor channel conditions).

The exemplary method can also include the operations of block 1230, where the UE can, based on determining that the WUS is detected during the particular WMO, perform one or more first operations during a first time period associated with the WMO. The exemplary method can also include the operations of block 1260, where the UE can, based on determining that the WUS is not detected during the particular WMO, perform one or more second operations during a second time period. In various embodiments, the second time period can be the same as or different from the first duration.

In some embodiments, the first time period can comprise one or more timeslots, each timeslot associated with a respective first operation. In such embodiments, performing the first operations, during the one or more timeslots, is further based on whether the first operations are permitted during their respective associated timeslots.

In some embodiments, the first time period comprises one of the following: a discontinuous reception (DRX) On duration; a first number of timeslots beginning at a second number of timeslots after a timeslot including the particular WMO; or M timeslots of every N consecutive timeslots after the timeslot including the particular WMO, where M<N.

In some embodiments, the first operations conditionally performed during the first time period in block 1230 can include the operations of sub-block 1231, and the second operations conditionally performed during the second time period in block 1260 can include the operations of sub-block 1261. In sub-block 1231, the UE can monitor a first physical downlink control channel (PDCCH) search space for PDCCH candidates. In sub-block 1261, the UE can monitor a second PDCCH search space for PDCCH candidates. In such embodiments, the first time period can the same as the second time period. In various embodiments, the second PDCCH search space can be a subset of, partially overlapping with, or non-overlapping with the first PDCCH search space.

In other embodiments, the first operations conditionally performed during the first time period in block 1230 can include the operations of sub-block 1232, and the second operations conditionally performed during the second time period in block 1260 can include the operations of sub-block 1262. In sub-block 1232, the UE can monitor a first physical downlink control channel (PDCCH) search space for PDCCH candidates whose downlink control information (DCI) cyclic redundancy check (CRC) is scrambled by any of a first set of identifiers. For example, such identifiers can be various types of RNTIs that are associated with the UE. In sub-block 1262, the UE can monitor the PDCCH search space for PDCCH candidates whose DCI CRC is scrambled by any of a second set of identifiers. In such embodiments, the first time period can be the same as the second time period. Furthermore, in some embodiments, the first set of identifiers and second set of identifiers differ by at least one identifier. For example, the first set of identifiers can include a cell radio network temporary identifier (C-RNTI) associated with the UE, and the second set of identifiers can exclude the C-RNTI.

In some embodiments, the first and second operations include performing at least one of the following: channel state information (CSI) measurements; radio resource management (RRM) measurements; and radio link management (RLM) measurements. In such embodiments, the first operations can be performed based on a first configuration for the measurements, and the second operations can be performed based on a second configuration for the measurements. In such embodiments, the first time period can be the same as the second time period.

In some embodiments, the first operations conditionally performed during the first time period in block 1230 can include the operations of sub-block 1233, and the second operations conditionally performed during the second time period in block 1260 can include the operations of sub-block 1263. In sub-block 1233, the UE can transmit, to the network node during the first time period, one or more of the following group: sounding reference signals (SRS), and channel state information (CSI). In sub-block 1263, the UE can refrain from transmitting any of said group during the second time period. In such embodiments, the first time period can be the same as the second time period.

In some embodiments, the first operations conditionally performed during the first time period in block 1230 can include the operations of sub-block 1234, and the second operations conditionally performed during the second time period in block 1260 can include the operations of sub-block 1261 (discussed above). In sub-block 1234, the UE can transmit an acknowledgement (WUS-ACK) during the first time period, e.g., indicating that the WUS was correctly detected. In such embodiments, the first time period is before monitoring for a subsequent PDCCH transmission. As discussed above, in sub-block 1261, the UE can monitor, during the second time period, a second PDCCH search space for PDCCH candidates associated with any of one or more identifiers (e.g., RNTIs). In such embodiments, the second time period can be different than the first time period.

In some embodiments, the exemplary method can also include the operations of block 1240, where the UE can, based on determining that the WUS is detected during the particular WMO, receive scheduling information in the WUS for a subsequent PDSCH transmission. For example, the UE can receive the scheduling information based on the WUS configuration received in block 1210, such as a DCI message format associated with scheduling information.

In some embodiments, the exemplary method can also include the operations of block 1250, where the UE can, based on determining that the WUS is detected during the particular WMO, receive configuration information, with the WUS, related to at least one of the following: the first operations, the second operations, the first time period, and the second time period. For example, a WUS-DCI (e.g., command) can indicate a plurality of states, with each state used to control a different aspect of the first operations, the second operations, the first time period, and/or the second time period.

Figure 13:
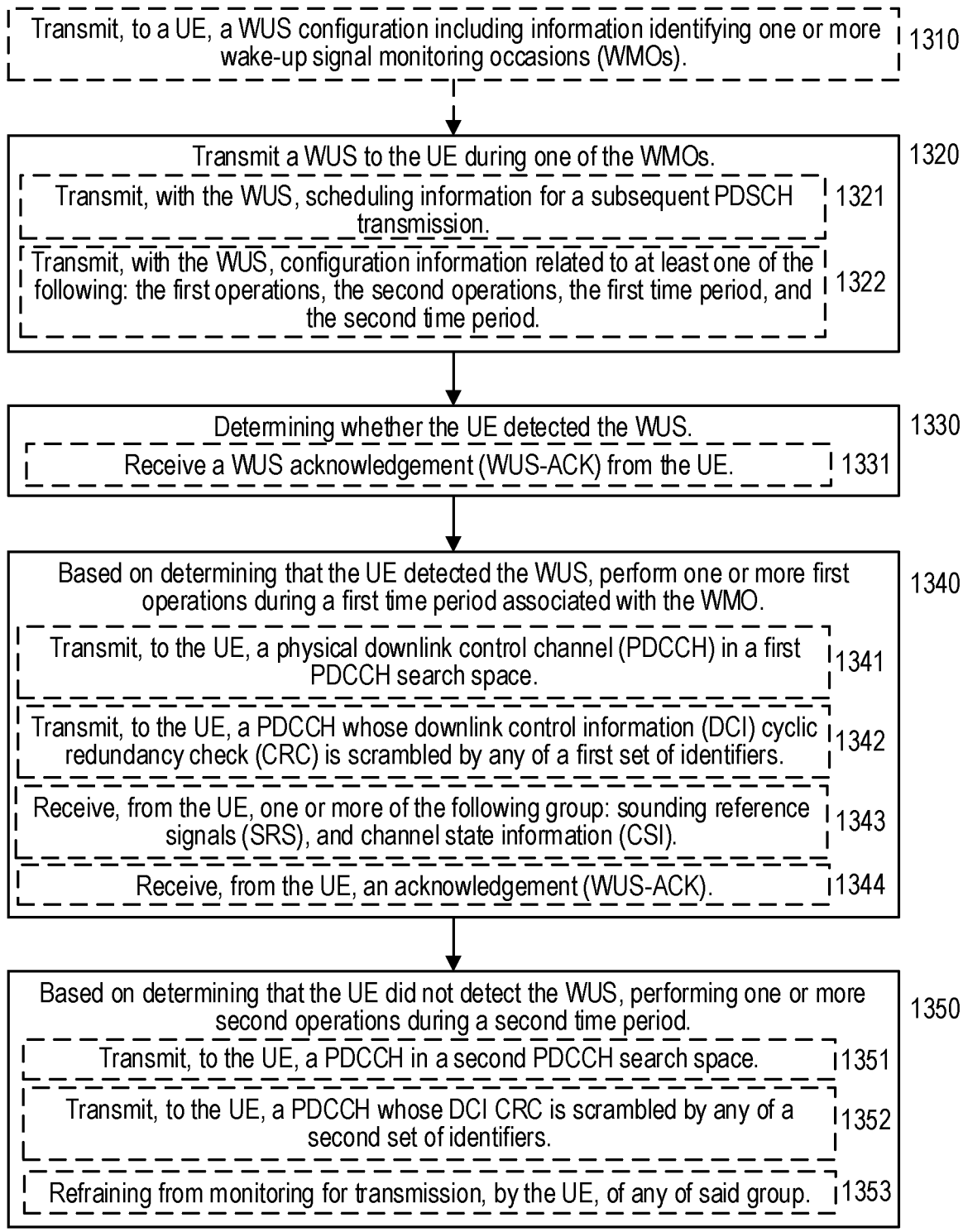
FIG. 13 shows a flow diagram of an exemplary method (e.g., procedure) performed by a network node (e.g., base station, gNB, eNB, etc. or component thereof) in a radio access network (RAN, e.g., E-UTRAN, NG-RAN), according to various exemplary embodiments of the present disclosure.

In addition, FIG. 13 shows a flow diagram of an exemplary method (e.g., procedure) for performing different operations based on the result of user equipment (UE) detection of a wake-up signal (WUS), according to various exemplary embodiments of the present disclosure. The exemplary method can be performed by a network node (e.g., base station, eNB, gNB, etc., or component thereof) of a radio access network (RAN, e.g., E-UTRAN, NG-RAN). For example, the exemplary method shown in FIG. 13 can be implemented in a network node configured as described herein with reference to other figures. Furthermore, the exemplary method shown in FIG. 13 can be used cooperatively with other exemplary methods described herein (e.g., FIG. 12) to provide various exemplary benefits described herein. Although FIG. 13 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1310, where the network node can transmit, to the UE, a WUS configuration including information identifying one or more WUS monitoring occasions (WMOs). In some embodiments, the WUS configuration can also include various information associated with a WUS transmission (e.g., during the WMOs), including any of the following:

a CORESET;
a search space type or identifier;
an aggregation level (AL);
one or more radio network temporary identifiers (RNTI); and
downlink control information (DCI) message format associated with scheduling information for a subsequent PDSCH transmission.

The exemplary method can also include operations of block 1320, where the network node can transmit a WUS to the UE during a particular WMO for the UE. In some embodiments, the particular WMO can be one of the WMOs identified in the WUS configuration (e.g., transmitted in block 1310). In some embodiments, the operations of block 1320 can include the operations of sub-block 1321, where the network node can transmit, with the WUS, scheduling information for a subsequent PDSCH transmission. For example, the network node can transmit the scheduling information based on the WUS configuration transmitted in block 1310, such as a DCI message format associated with scheduling information.

The exemplary method can also include operations of block 1330, where the network node can determine whether the UE detected the transmitted WUS. In some embodiments, the operations of block 1330 can also include the operations of sub-block 1331, where the network node can receive a WUS acknowledgement (WUS-ACK) from the UE, indicating that the UE detected the WUS during the particular WMO.

The exemplary method can also include operations of block 1340, where the network node can, based on determining that the UE detected the WUS, perform one or more first operations during a first time period associated with the WMO. The exemplary method can also include operations of block 1350, where the network node can, based on determining that the UE did not detect the WUS, perform one or more second operations during a first time period. In various embodiments, the second time period can be the same as or different than the first time period.

In some embodiments, the first time period comprises one of the following: a discontinuous reception (DRX) On duration; a first number of timeslots beginning at a second number of timeslots after a timeslot including the particular WMO; or M timeslots of every N consecutive timeslots after the timeslot including the particular WMO, where M<N.

In some embodiments, the first operations conditionally performed during the first time period in block 1340 can include the operations of sub-block 1341, and the second operations conditionally performed during the second time period in block 1350 can include the operations of sub-block 1351. In sub-block 1341, the network node can transmit, to the UE, a physical downlink control channel (PDCCH) in a first PDCCH search space. In sub-block 1351, the network node can transmit, to the UE, a PDCCH in a second PDCCH search space. In such embodiments, the first time period can the same as the second time period. In various embodiments, the second PDCCH search space can be a subset of, partially overlapping with, or non-overlapping with the first PDCCH search space.

In other embodiments, the first operations conditionally performed during the first time period in block 1340 can include the operations of sub-block 1342, and the second operations conditionally performed during the second time period in block 1350 can include the operations of sub-block 1352. In sub-block 1342, the network node can transmit, to the UE, a physical downlink control channel (PDCCH) whose downlink control information (DCI) cyclic redundancy check (CRC) is scrambled by any of a first set of identifiers. For example, such identifiers can be various types of RNTIs that are associated with the UE. In sub-block 1352, the network node can transmit, to the UE, a PDCCH whose DCI CRC is scrambled by any of a second set of identifiers. In such embodiments, the first time period can be the same as the second time period. Furthermore, in some embodiments, the first set of identifiers and second set of identifiers differ by at least one identifier. For example, the first set of identifiers can include a cell radio network temporary identifier (C-RNTI) associated with the UE, and the second set of identifiers can exclude the C-RNTI.

In some embodiments, the first operations conditionally performed during the first time period in block 1340 can include the operations of sub-block 1343, and the second operations conditionally performed during the second time period in block 1350 can include the operations of sub-block 1353. In sub-block 1343, the network node can receive, from the UE during the first time period, one or more of the following group: sounding reference signals (SRS), and channel state information (CSI). In sub-block 1353, the network node can refrain from monitoring, during the second time period, for transmission by the UE of any of said group. In such embodiments, the first time period can be the same as the second time period.

In some embodiments, the first operations conditionally performed during the first time period in block 1340 can include the operations of sub-block 1344, and the second operations conditionally performed during the second time period in block 1350 can include the operations of sub-block 1351 (discussed above). In sub-block 1344, the network node can receive an acknowledgement (WUS-ACK) from the UE during the first time period, e.g., indicating that the WUS was correctly detected. In such embodiments, the first time period is before transmitting a PDCCH to the UE (e.g., with DCI for the UE). As discussed above, in sub-block 1351, the network node can transmit, to the UE during the second time period, a PDCCH in a second PDCCH search space. In such embodiments, the second time period can be different than the first time period.

In some embodiments, the operations of block 1320 can include the operations of sub-block 1322, where the network node can transmit, with the WUS, configuration information related to at least one of the following: the first operations, the second operations, the first time period, and the second time period. For example, a WUS-DCI (e.g., command) can indicate a plurality of states, with each state used to control a different aspect of the first operations, the second operations, the first time period, and/or the second time period.

Figure 14:
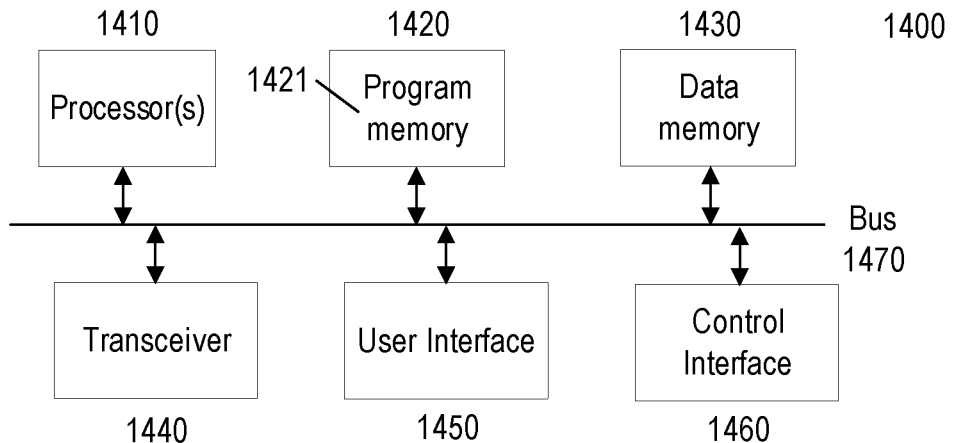
FIG. 14 is a block diagram of an exemplary wireless device or UE, according to various exemplary embodiments of the present disclosure.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 14 shows a block diagram of an exemplary wireless device or user equipment (UE) 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods procedures described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1461 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE

1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420 and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440 can include radio-frequency transmitter and/or receiver functionality that facilitates the UE 1400 to communicate with other equipment supporting like wireless communication standards and/or protocols. In some exemplary embodiments, the radio transceiver 1440 includes one or more transmitters and one or more receivers that enable UE 1400 to communicate according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, radio transceiver 1440 includes one or more transmitters and one or more receivers that can facilitate the UE 1400 to communicate with various LTE, LTE-Advanced (LTE-A), and/or NR networks according to standards promulgated by 3GPP. In some exemplary embodiments of the present disclosure, the radio transceiver 1440 includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, and/or supported by, data memory 1430.

User interface 1450 can take various forms depending on the particular embodiment of UE 1400, or can be absent from UE 1400 entirely. In some embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1400 having a touch screen display are capable of receiving user inputs, such as inputs related to exemplary methods described herein or otherwise known to persons of ordinary skill.

In some embodiments, UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the UE 1400 can take various forms depending on the particular exemplary embodiment of UE 1400 and of the particular interface requirements of other devices that the UE 1400 is intended to communicate with and/or control. For example, the control interface 1460 can comprise an RS-232 interface, an RS-4145 interface, a USB interface, an HDMI interface, a Bluetooth interface, an IEEE ("Firewire") interface, an I²C interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any exemplary embodiments (e.g., of methods) described herein.

Figure 15:
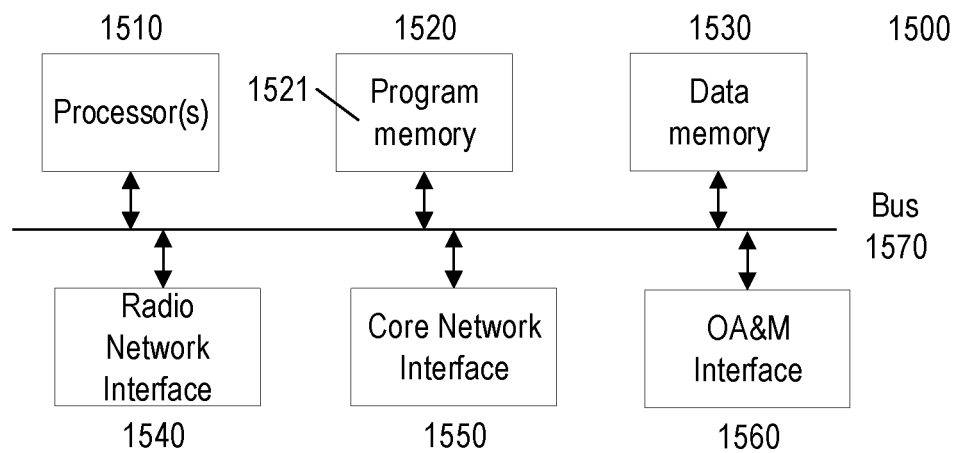
FIG. 15 is a block diagram of an exemplary network node, according to various exemplary embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some exemplary embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520 can store software code, programs, and/or instructions (collectively shown as computer program product 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1540 and/or core network interface 1550. By way of example, core network interface 1550 can comprise the S1 or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some embodiments, interface 1540 can also enable network node 1500 to communicate with compatible satellites of a satellite communication network. In some exemplary embodiments, radio network interface 1540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the 51 interface standardized by 3GPP. In some embodiments, core network interface 1550 can comprise the NG interface standardized by 3GPP. In some exemplary embodiments, core network interface 1550 can comprise one or more interfaces to one or more AMFs, SMFs, SGWs, MMEs, SGSNs, GGSNs, and other physical devices that comprise functionality found in GERAN, UTRAN, EPC, SGC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1500 can include hardware and/or software that configures and/or facilitates network node 1500 to communicate with other network nodes in a RAN, such as with other eNBs, gNBs, ng-eNBs, en-gNBs, IAB nodes, etc. Such hardware and/or software can be part of radio network interface 1540 and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
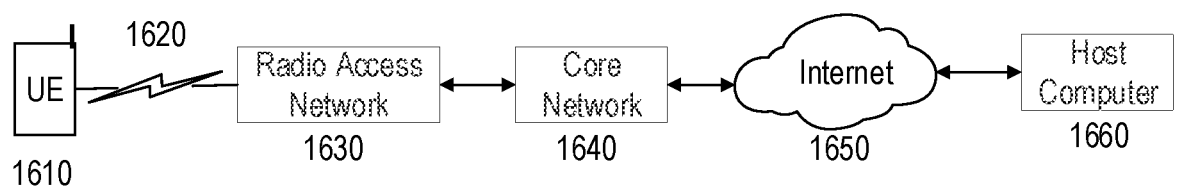
FIG. 16 is a block diagram of an exemplary network configured to provide over-the-top (OTT) data services between a host computer and a UE, according to various exemplary embodiments of the present disclosure.

FIG. 16 is a block diagram of an exemplary communication network configured to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1550 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an S1 interface. As another example, gNBs and ng-eNBs comprising an NG-RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf.

For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1630 to transmit wake-up signals to UEs—such as UE 1610—in a manner that reduces the UE power consumption for monitoring a PDCCH for further control messages. When used in NR and/or LTE UEs (e.g., UE 1610) and eNBs and/or gNBs (e.g., comprising RAN 1630), exemplary embodiments described herein can reduce UE power consumption for PDCCH monitoring, thereby facilitating such UEs to use their stored energy capacity (e.g., in a battery) for other operations, such as receiving and/or transmitting data via OTT services. Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for performing different operations based on detection of a wake-up signal (WUS) transmitted by a network node in a radio access network (RAN), the method comprising:
   receiving, from the network node, information identifying:
      a configuration of resources that can carry a WUS transmission; and
      one or more WUS monitoring occasions (WMOs);
   detecting the presence of the WUS in the configured resources during a particular WMO;
   based on detecting that the WUS is present, performing one or more first operations in a first duration associated with the WMO; and
   based on failing to detect that the WUS is present, performing one or more second operations in a second duration.

2. The method of embodiment 1, wherein the first duration comprises one of:
   a discontinuous reception (DRX) on period within a DRX cycle; and
   a first number of timeslots beginning at a second number of timeslots after a timeslot comprising the WMO, wherein the first number of timeslots can be contiguous or non-contiguous.

3. The method of embodiment 1, wherein:
   the first duration comprises one or more timeslots, each timeslot associated with a respective first operation;
   the method further comprises refraining from performing a particular first operation based on determining that the particular first operation is not permitted in the associated timeslot.

4. The method of any of embodiments 1-3, wherein:
   the first operations comprise monitoring a first physical downlink control channel (PDCCH) search space for PDCCH candidates associated with any of one or more identifiers;
   the second operations comprise monitoring a second PDCCH search space for PDCCH candidates associated with any of the one or more identifiers; and
   the first duration is different than the second duration.

5. The method of embodiment 4, wherein the second PDCCH search space is a subset of the first PDCCH search space.

6. The method of any of embodiments 1-3, wherein:
   the first operations comprise monitoring a physical downlink control channel (PDCCH) search space for PDCCH candidates associated with any of a first set of identifiers;
   the second operations comprise monitoring the PDCCH search space for PDCCH candidates associated with any of a second set of identifiers; and
   the first duration is different than the second duration.

7. The method of embodiment 6, wherein the first set and second set differ by at least one identifier.

8. The method of any of embodiments 1-3, wherein:
   the first and second operations comprise performing at least one of the following:
      channel state information (CSI) measurements;
      radio resource management (RRM) measurements;
      radio link management (RLM) measurements;

the first operations are performed based on a first configuration;
the second operations are performed based on a second configuration; and
the first duration is the same as the second duration.
9. The method of any of embodiments 1-3, wherein:
the first operations comprise transmitting information to the network, where the information comprises one or more of the following:
sounding reference signals (SRS);
channel state information (CSI) measurements; and
scheduling requests;
the second operations comprise refraining from transmitting the information to the network; and
the first duration is the same as the second duration.
10. The method of embodiment 1, wherein the WUS transmission comprises scheduling information for a subsequent PDSCH transmission.
11. The method of embodiment 10, wherein:
the first operations comprise:
transmitting an acknowledgement (WUS-ACK) if the scheduling information is correctly received, and
transmitting a negative acknowledge (WUS-NACK) if the scheduling information is incorrectly received; and
the first duration comprises one of the following:
prior to monitoring for a subsequent physical downlink control channel (PDCCH) transmission; and
in response to the subsequent PDSCH transmission.
12. The method of embodiment 11, wherein the WUS-ACK or WUS-NACK is multiplexed together with a hybrid ARQ ACK or NACK relating to the PDSCH transmission.
13. The method of any of embodiments 11-12, wherein:
the second operations comprise monitoring a second PDCCH search space for PDCCH candidates associated with any of the one or more identifiers; and the first duration is different than the second duration.
14. The method of any of embodiments 10-13, wherein the configuration of resources that can carry the WUS transmission comprising the scheduling information is based on any of the following:
a CORESET;
a search space type or identifier (ID);
an aggregation level (AL);
periodicity of WMOs;
one or more radio network temporary identifiers (RNTI); and
downlink control information (DCI) message format associated with the scheduling information.
15. The method of any of embodiments 10-14, wherein the WUS transmission further comprises configuration information related to at least one of the following: the first operations, the second operations, the first duration, and the second duration.
16. A method for performing different operations based on the result of user equipment (UE) detection of a wake-up signal (WUS) transmitted by a network node in a radio access network (RAN), the method comprising:
transmitting, to the UE, information identifying:
a configuration of resources that can carry a WUS transmission; and
one or more WUS monitoring occasions (WMOs);
transmitting a WUS to the UE during one of the WMO according to the configuration of resources;
determining whether the UE successfully received the WUS;
based on determining that the UE successfully receive the WUS, performing one or more first operations in a first duration associated with the WMO; and
based on determining that the UE did not successfully receive the WUS, performing one or more second operations in a second duration.
17. The method of embodiment 16, wherein the first duration comprises one of:
a discontinuous reception (DRX) on period within a DRX cycle; and
a first number of timeslots beginning at a second number of timeslots after a timeslot comprising the WMO, wherein the first number of timeslots can be contiguous or non-contiguous.
18. The method of embodiment 16, wherein determining whether the UE successfully received the WUS comprises receiving a WUS acknowledgement (WUS-ACK) from the UE.
19. The method of any of embodiments 16-18, wherein:
the first operations comprise transmitting, to the UE, a physical downlink control channel (PDCCH) in a first PDCCH search space;
the second operations comprise transmitting, to the UE, a PDCCH in a second PDCCH search space; and
the first duration is different than the second duration.
20. The method of embodiment 19, wherein the second PDCCH search space is a subset of the first PDCCH search space.
21. The method of any of embodiments 16-18, wherein:
the first operations comprise transmitting, to the UE, a physical downlink control channel (PDCCH) associated with any of a first set of identifiers;
the second operations comprise transmitting, to the UE, a PDCCH associated with any of a second set of identifiers; and
the first duration is different than the second duration.
22. The method of embodiment 21, wherein the first set and second set differ by at least one identifier.
23. The method of any of embodiments 16-18, wherein:
the first operations comprise receiving, from the UE during the first duration, one or more of the following group:
sounding reference signals (SRS);
channel state information (CSI) measurements; and
scheduling requests;
the second operations comprise failing to detect transmissions, by the UE during the second duration, of any of said group; and
the first duration is the same as the second duration.
24. The method of embodiment 1, wherein the WUS transmission comprises scheduling information for a subsequent PDSCH transmission.
25. The method of embodiment 24, wherein:
the first operations comprise:
receiving an acknowledgement (WUS-ACK) indicating that the scheduling information was correctly received, and
receiving a negative acknowledge (WUS-NACK) indicating that the scheduling information was not correctly received; and
the first duration comprises one of the following:
prior to transmitting a physical downlink control channel (PDCCH); and
subsequent to the PDSCH transmission.

26. The method of embodiment 25, wherein the WUS-ACK or WUS-NACK is multiplexed together with a hybrid ARQ ACK or NACK relating to the PDSCH transmission.

27. The method of any of embodiments 25-26, wherein:
the second operations comprise transmitting, to the UE, a PDCCH in a second PDCCH search space; and
the first duration is different than the second duration.

28. The method of any of embodiments 24-27, wherein the configuration of resources that can carry the WUS transmission comprising the scheduling information can be based on any of the following:
a CORESET;
a search space type or identifier (ID);
an aggregation level (AL);
periodicity of WMOs;
one or more radio network temporary identifiers (RNTI); and downlink control information (DCI) message format associated with the scheduling information.

29. The method of any of embodiments 24-28, wherein the WUS transmission further comprises configuration information related to at least one of the following: the first operations, the second operations, the first duration, and the second duration.

30. A user equipment (UE) configured to perform different operations based on detection of a wake-up signal (WUS) transmitted by a network node in a radio access network (RAN), the UE comprising:
communication circuitry configured to communicate with a network node; and
processing circuitry operatively associated with the communication circuitry and configured to perform operations corresponding to the methods of any of exemplary embodiments 1-15.

31. A network node, in a radio access network (RAN), configured to perform different operations based on the result of user equipment (UE) detection of a wake-up signal (WUS) transmitted by the network node, the network node comprising:
communication circuitry configured to communicate with the one or more UEs; and
processing circuitry operatively associated with the communication circuitry and configured to perform operations corresponding to the methods of any of exemplary embodiments 16-29.

27. A non-transitory, computer-readable medium storing computer-executable instructions that, when executed by at least one processor of a user equipment (UE), configure the UE to perform operations corresponding to the methods of any of exemplary embodiments 1-15.

28. A non-transitory, computer-readable medium storing computer-executable instructions that, when executed by at least one processor of a network node, configure the network node to perform operations corresponding to the methods of any of exemplary embodiments 16-29.

The invention claimed is:

1. A method for a user equipment (UE) to perform different operations based on detection of wake-up signal (WUS) transmissions from a network node in a radio access network (RAN), the method comprising:
determining whether a WUS transmission, from the network node, is detected during a particular WUS monitoring occasion (WMO);
based on determining that the WUS is detected during the particular WMO, performing one or more first operations during a first time period associated with the particular WMO, wherein performing the one or more first operations comprises monitoring a first physical downlink control channel (PDCCH) search space for PDCCH candidates whose downlink control information (DCI) cyclic redundancy check (CRC) is scrambled by any of a first set of identifiers; and
based on determining that the WUS is not detected during the particular WMO, performing one or more second operations during a second time period, wherein performing the one or more second operations comprises monitoring a second PDCCH search space for the PDCCH candidates whose DCI CRC is scrambled by any of a second set of identifiers, wherein the second PDCCH search space is a subset of the first PDCCH search space,
wherein the first time period is the same as the second time period, and
wherein the first set of identifiers includes a cell radio network temporary identifier (C-RNTI) associated with the UE, and the second set of identifiers excludes the C-RNTI.

2. The method of claim 1, wherein the first time period comprises one of the following:
one or more discontinuous reception (DRX) On durations;
a first number of timeslots beginning at a second number of timeslots after a timeslot including the particular WMO; or
M timeslots of every N consecutive timeslots after the timeslot including the particular WMO, where M<N.

3. The method of claim 1, wherein:
the first time period comprises one or more timeslots, each timeslot associated with a respective first operation; and
performing the one or more first operations, during the one or more timeslots, is further based on whether the one or more first operations are permitted during their respective associated timeslots.

4. The method of claim 1, wherein:
the one or more first and the one or more second operations further comprise performing at least one of the following:
channel state information (CSI) measurements;
radio resource management (RRM) measurements;
radio link management (RLM) measurements;
the one or more first operations are performed based on a first configuration for the measurements; and
the one or more second operations are performed based on a second configuration for the measurements.

5. The method of claim 1, wherein:
performing the one or more first operations comprises transmitting, to the network node during the first time period, one or more of the following group:
sounding reference signals (SRS); and
channel state information (CSI);
performing the one or more second operations comprises refraining from transmitting any of said group during the second time period.

6. The method of claim 1, further comprising receiving, from the network node, a WUS configuration including information identifying one or more WMOs, including the particular WMO, wherein the WUS configuration further includes one or more of the following associated with the WUS transmission including the scheduling information:
a CORESET;
a search space type or identifier;
an aggregation level; and
one or more radio network temporary identifiers (RNTI).

7. The method of claim 1, wherein:
performing the one or more first operations comprises transmitting an acknowledgement (WUS-ACK);
the first time period is prior to monitoring for a subsequent physical downlink control channel (PDCCH) transmission;
performing the one or more second operations comprises monitoring a second PDCCH search space for PDCCH candidates associated with any of one or more identifiers; and
the second time period is different than the first time period.

8. The method of claim 1, wherein the method further comprises, based on determining that the WUS is detected during the particular WMO, receiving, with the WUS, configuration information related to at least one of the following: the one or more first operations, the one or more second operations, the first time period, and the second time period.

9. A method, performed by a network node in a radio access network (RAN) for performing different operations based on user equipment (UE) detection of wake-up signal (WUS) transmissions by the network node, the method comprising:
   transmitting a WUS to the UE during a particular WUS monitoring occasion (WMO) for the UE;
   determining whether the UE detected the transmitted WUS;
   based on determining that the UE detected the WUS, performing one or more first operations during a first time period associated with the WMO, wherein performing the one or more first operations comprises transmitting, to the UE, a first physical downlink control channel (PDCCH) search space for PDCCH candidates whose downlink control information (DCI) cyclic redundancy check (CRC) is scrambled by any of a first set of identifiers; and
   based on determining that the UE did not detect the WUS, performing one or more second operations during a second time period, wherein performing the one or more second operations comprises transmitting, to the UE, a second PDCCH search space for the PDCCH candidates whose DCI CRC is scrambled by any of a second set of identifiers, wherein the second PDCCH search space is a subset of the first PDCCH search space,
   wherein the first time period is the same as the second time period, and
   wherein the first set of identifiers includes a cell radio network temporary identifier (C-RNTI) associated with the UE, and the second set of identifiers excludes the C-RNTI.

10. The method of claim 9, wherein the first time period comprises one of the following:
   one or more discontinuous reception (DRX) On durations;
   a first number of timeslots beginning at a second number of timeslots after a timeslot including the particular WMO; or
   M timeslots of every N consecutive timeslots after the timeslot including the particular WMO, where M<N.

11. The method of claim 9, wherein determining whether the UE detected the WUS comprises receiving a WUS acknowledgement (WUS-ACK) from the UE.

12. The method of claim 9, wherein:
performing the one or more first operations includes receiving, from the UE during the first time period, one or more of the following group:
   sounding reference signals (SRS), and
   channel state information (CSI); and
performing the one or more second operations comprises refraining from monitoring, during the second time period, for transmission by the UE of any of said group.

13. The method of claim 9, further comprising transmitting, to the UE, a WUS configuration including information identifying one or more WMOs, including the particular WUS MO, wherein the WUS configuration also includes one or more of the following associated with the WUS transmission:
   a CORESET;
   a search space type or identifier;
   an aggregation level; and
   one or more radio network temporary identifiers (RNTI).

14. The method of claim 9, wherein:
performing the one or more first operations includes receiving an acknowledgement (WUS-ACK) from the UE;
the first time period is before transmitting a physical downlink control channel (PDCCH) to the UE;
performing the one or more second operations includes transmitting, to the UE, a PDCCH in a second PDCCH search space; and
the second time period is different than the first time period.

15. A user equipment (UE) configured to perform different operations based on detection of wake-up signal (WUS) transmissions from a network node in a radio access network RAN, the UE comprising:
   transceiver circuitry configured to communicate with the network node; and
   processing circuitry operatively coupled to the transceiver circuitry, the processing circuitry and the transceiver circuitry configured to perform operations corresponding to the method of claim 1.

16. A network node, in a radio access network (RAN), configured to perform different operations based on user equipment (UE) detection of wake-up signal (WUS) transmissions by the network node, the network node comprising:
   radio network interface circuitry configured to communicate with one or more UEs; and
   processing circuitry operatively coupled with the radio network interface circuitry, the processing circuitry and the radio network interface circuitry configured to perform operations corresponding to the method of claim 9.

* * * * *